(12) United States Patent
Kubota et al.

(10) Patent No.: US 8,789,076 B2
(45) Date of Patent: Jul. 22, 2014

(54) TRANSPORTATION BODY FOR FLEXIBLE OPTICAL DISK, OPTICAL DISK TRANSPORTATION APPARATUS, AND OPTICAL DISK TRANSPORTATION METHOD

(75) Inventors: Masashi Kubota, Tokyo (JP); Kenji Tagami, Tokyo (JP); Hisaya Niizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 12/920,155

(22) PCT Filed: Feb. 12, 2009

(86) PCT No.: PCT/JP2009/052333
§ 371 (c)(1),
(2), (4) Date: Aug. 30, 2010

(87) PCT Pub. No.: WO2009/116333
PCT Pub. Date: Sep. 24, 2009

(65) Prior Publication Data
US 2011/0010731 A1    Jan. 13, 2011

(30) Foreign Application Priority Data
Mar. 18, 2008 (JP) ................... 2008-070453

(51) Int. Cl.
*G11B 17/03* (2006.01)
*G11B 17/028* (2006.01)
(52) U.S. Cl.
USPC ........................................ 720/703; 369/30.28
(58) Field of Classification Search
USPC ...................... 369/30.28–30.35, 30.51–30.62; 720/703, 715, 668
See application file for complete search history.

(56) References Cited

U.S. PATENT DOCUMENTS

| | | | | | |
|---|---|---|---|---|---|
| 4,002,826 | A | * | 1/1977 | Iemenschot | 369/261 |
| 4,553,232 | A | * | 11/1985 | Covington et al. | 369/287 |
| 4,839,881 | A | * | 6/1989 | Takahara et al. | 720/612 |
| 5,090,000 | A | * | 2/1992 | Nozu et al. | 369/44.25 |
| 5,105,418 | A | * | 4/1992 | Kenmotsu et al. | 369/195 |
| 5,734,629 | A | * | 3/1998 | Lee et al. | 369/30.34 |
| 6,141,298 | A | * | 10/2000 | Miller | 369/30.33 |
| 2002/0114254 | A1 | * | 8/2002 | Ohgaki | 369/75.2 |
| 2003/0002400 | A1 | * | 1/2003 | Klein | 369/30.55 |
| 2005/0185552 | A1 | * | 8/2005 | Benedikt et al. | 369/53.21 |

(Continued)

FOREIGN PATENT DOCUMENTS

| | | |
|---|---|---|
| JP | 51-69930 | 6/1976 |
| JP | 62-212935 | 9/1987 |

(Continued)

OTHER PUBLICATIONS

International Search Report, PCT/JP2009/052333, Mar. 24, 2009.

*Primary Examiner* — Adam B Dravininkas
(74) *Attorney, Agent, or Firm* — Young & Thompson

(57) ABSTRACT

A transportation body 1 for a flexible optical disk 10 has flexibility, and includes a rotation stabilizing board 2 having a disk-shaped form, an optical disk alignment unit 4 installed in the central part of the rotation stabilizing board 2, and a spacer 3 installed on a surface of the rotation stabilizing board 2. A combination of the transportation body 1 and the optical disk 10 can be treated as an equivalent of a conventional optical disk having rigidity, by transporting the flexible optical disk 10 placed on the transportation body 1 and by recording/reproducing information onto/from the flexible optical disk.

18 Claims, 10 Drawing Sheets

(56) References Cited

U.S. PATENT DOCUMENTS

2007/0130578 A1* 6/2007 Ido et al. .................. 720/703
2008/0117726 A1* 5/2008 Yoshida et al. ............ 369/30.28

FOREIGN PATENT DOCUMENTS

| | | |
|---|---|---|
| JP | 10-308059 | 11/1998 |
| JP | 2004-145995 | 5/2004 |
| JP | 2006-268900 | 10/2006 |
| JP | 2007-012204 | 1/2007 |
| JP | 2007-213740 | 8/2007 |
| JP | 2007-287243 | 11/2007 |
| JP | 2007-293965 | 11/2007 |
| JP | 2008-287819 | 11/2008 |

* cited by examiner

TRANSPORTATION BODY FOR FLEXIBLE OPTICAL DISK, OPTICAL DISK TRANSPORTATION APPARATUS, AND OPTICAL DISK TRANSPORTATION METHOD

TECHNICAL FIELD

The present invention relates to an optical disk having flexibility (a flexible optical disk). More particularly, the present invention relates to a transportation body capable of transporting a flexible optical disk while compensating for low rigidity, and to an optical disk transportation apparatus and an optical disk transportation method that transport the flexible optical disk to various apparatuses using the flexible optical disk, such as an optical disk information recording and reproducing apparatus, and an optical disk changer, and an optical disk accessor.

BACKGROUND ART

In recent years, with the development of laws concerning the storage of information, such as electronic documents act and SOX act (Sarbanes-Oxley Act), and with the development of ILM (Information Lifecycle Management), the demand for a long-term storage of information has increased explosively. To meet such a demand, development of an information recording medium and an information recording and reproducing apparatus that have a large capacity, high reliability, and low cost has been desired.

Conventionally, for such a long-term storage of information, information recording and reproducing apparatuses using optical disks such as a low-cost DVD (Digital Versatile Disc), magnetic tapes such as a LTO (Linear Tape-Open), or the like have been used. However, the magnetic tapes such as the LTO have problems such as a slow speed of access to information recorded as well as shortness of the storage life of the information that is the most important reliability item. In recent years, there is a also a demand for a higher speed of access to the information stored in the information recording medium, for the information-recording medium and the information recording and reproducing apparatus for long-term storage so as to facilitate management of the information stored.

On the other hand, the optical disks such as a DVD meet the demand for long-term storage in terms of storage life and access speed, but has a problem of shortage of storage capacity of the optical disks serving as information recording media, for example.

Measures to solve the shortage of the storage capacity of the media mentioned above have been taken by using a film-shaped optical disk to deal with such a problem in the information recording and reproducing apparatus using the optical disk. This measures are aimed at obtaining an effect that is equivalent such that the capacity of the optical disk serving as the information-recording medium is increased. The effect is obtained such that the thickness of around 1.2 mm of the optical disks such as the DVD is reduced to around 0.1 mm-0.3 mm to obtain a film shape, thereby increasing a packing density per volume of the optical disk.

When a file-shaped optical disk having flexibility (in other words, a flexible optical disk) is used for recording and reproducing information, the information recording medium having a large storage capacity, a long storage life and a high access speed and suitable for long-term storage of information at low cost. However, the reduction in thickness of the optical disk results in lowering the rigidity in the rotation axis direction of the optical disk. Therefore, the reduction in the rigidity of the optical disk must be compensated for so as not to case any problem when the film-shaped optical disk is operated in the information recording and reproducing apparatus. Such a compensation is required particularly at the time of rotation of the optical disk and at the time of transportation of the optical disk.

When the film-shaped optical disk is directly rotated at high speed, unlike the conventional optical disk having a thickness of 1.2 mm, the surface wobbling of the optical disk increases due to the shortage of the rigidity. Therefore, it is difficult to stably obtain an excellent recording/reproducing performance. For example, as a related technology, the following method is proposed in Patent Document 1 (Japanese Unexamined Patent Application Publication No. 62-212935). In this method, a separate member having high rigidity (called a stabilization member) is installed in proximity to the film-shaped optical disk, and Bernoulli effect of airflow between the optical disk and the stabilization member is used to suppress the surface wobbling of the optical disk.

In addition, it is desirable that distance between the stabilization member and the optical disk be reduced to about 0.1 mm so that an effect to reduce the surface wobbling of the optical disk by the Bernoulli effect is provided by the above method using the stabilization member. In this case, it is highly possible that the stabilization member comes in contact with the optical disk, and damages the optical disk rises. Therefore, in this method, it is necessary to take measures to prevent the optical disk from being damaged due to the contact between the optical disk and the stabilization member. For example, as a countermeasure for preventing the optical disk from being damaged like this, Patent Document 2 (Japanese Unexamined Patent Application Publication No. 2007-12204) discloses an effective method as follows. That is, by using the stabilization member (called a rotation stabilizing board) having a through-hole for inflow of air and having a disc shape like an optical disk, the stabilization member and the optical disk rotate together while the rotation axes thereof coincide with each other in a state where the stabilization member and the optical disk are disposed adjacent to each other.

However, the conventional stabilization member (i.e., rotation stabilizing board) having a disk shape, which is used in this method, has a prerequisite that the stabilization member is mounted as a turntable separately from the optical disk on the spindle motor provided in the optical drive serving as the information recording and reproducing apparatus. Therefore, the conventional stabilization member has drawbacks in that the structure of the optical drive is complicated, and the optical disk dedicated for the film-shaped optical disk needs to be produced, resulting in an increase in production cost of the optical drive.

In addition, it becomes a risk factor for the long-term storage of the information to use such a dedicated optical drive, in the future utilization of the information. This is because if the acquisition of the optical drive to reproduce the information stored in the optical disk becomes difficult in the future, even if the optical disk itself can be stored for a long-term, such a situation that the information that is stored for a long term cannot be utilized may occur. A use of the dedicated optical drive limits the number of optical drive manufacturers supplying the optical drives. This is disadvantageous in obtaining the optical drive in the future. Therefore, it is desirable that commercially-available optical drives mass produced for the optical disk having a thickness of 1.2 mm can be used from the viewpoint of easiness of acquisition of the optical drive in the future, instead of the optical drive dedicated for the optical disk, among the optical drives for the film-shaped flexible optical disks.

Conventionally, the rotation stabilizing board which is used in the above method has no mechanism for aligning the rotation axis of the flexible optical disk placed on the rotation stabilizing board with the rotation axis of the spindle motor. For this reason, the rotation axis of the rotation stabilizing board is sometimes greatly decentered from the rotation axis of the spindle motor, in the case of using the rotation stabilizing board. Therefore, there is a problem that it becomes difficult to record/reproduce information stably.

On the other hand, a transportation apparatus such as a changer apparatus or an accessor apparatus that transport an optical disk to an optical drive from a storage device of the optical disk is necessary when information is recorded/reproduced with respect to a plurality of optical disks in an information storage apparatus such as an optical disks library apparatus. When such a transportation apparatus transports the film-shaped flexible optical disks, it is necessary to take a measure to compensate for the reduction in rigidity of the optical disk. In other words, it is necessary to take a measure to suppress a deformation when the optical disk is transported, because the amount of deformation due to its own weight or the amount of deformation when a transportation acceleration is applied, of the optical disk of this kind is larger than them that of the optical disk having a thickness of 1.2 mm.

As conventional measures to suppress the deformation of the flexible optical disks being transported, the following methods are proposed. For example, a Patent Document 3 (Japanese Unexamined Patent Application Publication No. 2006-268900) discloses a method of transporting an optical disk placed in a half cartridge. Patent Document 4 (Japanese Unexamined Patent Application Publication No. 2004-145995) discloses a method of transporting an optical disk being pinched by rollers. Patent Document 5 (Japanese Unexamined Patent Application Publication No. 2007-293965) discloses a method of transporting an optical disk being pinched between a sheet-like matrix and a sheet-like cover. However, these methods have a drawback that the structure of not only the transportation apparatus but also the information recording and reproducing apparatus is complicated. Therefore a simpler and easier transportation method has been desired.

[Patent Document 1]
Japanese Unexamined Patent Application Publication No. 62-212935
[Patent Document 2]
Japanese Unexamined Patent Application Publication No. 2007-12204
[Patent Document 3]
Japanese Unexamined Patent Application Publication No. 2006-268900
[Patent Document 4]
Japanese Unexamined Patent Application Publication No. 2004-145995
[Patent Document 5]
Japanese Unexamined Patent Application Publication No. 2007-293965

DISCLOSURE OF INVENTION

Technical Problem

As mentioned above, the method using the reduction effect of the surface wobbling of the optical disk based on Bernoulli effect is effective so that the lack of rigidity of the film-shaped flexible optical disk is compensated at the time of rotation thereof. However, there is a problem that the production cost of the optical drive increases because the method using the stabilization member as disclosed in Patent Document 1 and the method using the rotation stabilizing board as disclosed in Patent Document 2 make the structure of the optical drive complicated and require the optical drive that is produced exclusively for the film-shaped optical disk. In addition, the use of the exclusive optical drive will make acquisition of the optical drive difficult in the future and may cause the situation where information stored for a long term cannot be utilized.

Furthermore, in the above-mentioned rotation stabilizing board, there is another problem that it is difficult to record/reproduce information stably, because the rotation stabilization board has no mechanism for aligning the rotation axis of the optical disk with the rotation axis of the spindle motor.

On the other hand, according to the method disclosed in Patent Document 3-5, the lack of rigidity can be compensated for and the deformation can be suppressed. However, these methods have a problem that the structure of not only the transportation apparatus but also the information recording and reproducing apparatus is complicated.

This invention has been made in view of the related art circumstances mentioned above. A purpose of this invention is to provide a transportation body for a flexible optical disk, an optical disk transportation apparatus using the transportation body, and an optical disk transportation method which can suppress the deformation of the flexible optical disk at the time of rotation and transportation without complicating the structure of various apparatuses (an optical disk information recording and reproducing apparatus, an optical disk changer, an optical disk accessor, or the like) using the flexible optical disk.

Another purpose of this invention is to provide a transportation body for a flexible optical disk, an optical disk transportation apparatus using the transportation body, and an optical disk transportation method which can record/reproduce information with respect to the flexible optical disk stably by using a general-purpose optical drive.

The other purposes of this invention, not specifically mentioned herein, will be apparent from the following explanation and the attached drawings.

Technical Solution (1) A transportation body for a flexible optical disk according to a first exemplary aspect of this invention is characterized by including:
a rotation stabilizing board having a disc-shaped form;
an optical disk alignment unit installed in a central part of the rotation stabilizing board; and
a spacer installed on a surface of the rotation stabilizing board.

Because the transportation body for a flexible optical disk according to the first exemplary aspect of this invention has the construction mentioned above, the flexible optical disk placed on a surface of the transportation body can be treated as an equivalent of the optical disk with conventional rigidity. Therefore, the complexity of the structure of the various apparatuses involving transportation of flexible optical disks, such as the optical disk changer and the optical disk accessor, by transporting the flexible optical disk to the optical drive serving as the information recording and reproducing apparatus in the state where the optical disk is placed on the surface of the transportation body.

Further, deformation (surface wobbling or tilt change) of the optical disk occurring at the time of rotation can be suppressed by the Bernoulli effect obtained by airflow generated between the surfaces of the optical disk and the rotation stabilizing board, in the case of recording/reproducing information with respect to the optical disk by rotating the flexible optical disk that is placed on the surface of the transportation body, by the optical drive.

Furthermore, decentering of the rotation axis of the spindle motor from the rotation axis of the optical disk can be suppressed by an alignment action of the optical disk alignment unit, by placing the flexible optical disks on the surface of the transportation body so that the central hole of the flexible optical disk engages with the optical disk alignment unit and engaging the optical disk alignment unit with the spindle motor provided in the optical drive so that the rotation axes of both the optical disk alignment unit and the spindle motor coincide with each other.

Further, the suppression of the deformation of the flexible optical disk mentioned above and the addition of the rigidity to the flexible optical disk can be achieved by the transportation body which is separated from the optical drive.

Therefore, with the transportation body, the structure of the optical disk information recording and reproducing apparatus using the flexible optical disk is not complicated, and information can be recorded/reproduced the flexible optical disk even when a general-purpose optical drive is used.

For the above-mentioned reason, according to the transportation body of the first exemplary aspect of this invention, the deformation of the flexible optical disk at the time of rotation and transportation can be suppressed without complicating the structure of various apparatuses (an optical disk information recording and reproducing apparatus, an optical disk changer, an optical disk accessor, or the like) using the flexible optical disk. Further, the recording/reproducing of the information with respect to the flexible optical disk is can be done stably with the general-purpose optical drive.

(2) In a preferred example of the transportation body for the flexible optical disk according to the first exemplary aspect of this invention, an area that is opposite at least to an information recorded reproduction area of the optical disk of the rotation stabilizing board has light transmissivity.

(3) In another preferred example of the transportation body for the flexible optical disk according to the first exemplary aspect of this invention, the rotation stabilizing board has a light blocking effect.

(4) In further another preferred example of the transportation body for the flexible optical disk according to the first exemplary aspect of this invention, the optical disk alignment unit includes a taper barrel part that can be engaged with a central hole of the optical disk, and an outer diameter of the taper barrel part is set smaller than a diameter of the central hole of the optical disk.

(5) In further another preferred example of the transportation body for the flexible optical disk according to the first exemplary aspect of this invention, a product of the Young's modulus of the rotation stabilizing board and a cube of a thickness in a direction along an rotation axis of the rotation stabilizing board (rotation axis direction) is set to become equal to 3N*m or greater than 3N*m.

(6) In further another preferred example of the transportation body for the flexible optical disk according to the first exemplary aspect of this invention, the optical disk alignment unit further includes a height adjustment part, and the rotation stabilizing board is installed on the height adjustment part.

(7) In further another preferred example of the transportation body for the flexible optical disk according to the first exemplary aspect of this invention, a height or a thickness of the height adjustment part is set to such a value that a total thickness of the height adjustment part, the rotation stabilizing board, the spacer, and the optical disk becomes approximately equal to a thickness of the optical disk having no flexibility.

(8) An optical disk transportation apparatus according to a second exemplary aspect of this invention which transports the flexible optical disk between an optical disk storage device and an information recording and reproducing apparatus is characterized by including:

an optical disk placement unit to place the flexible optical disk on the transportation body according to the first exemplary aspect of the present invention with taking out the flexible optical disk stored in the optical disk storage device; and an optical disk transportation unit to transport the transportation body on which the optical disk is placed to the information recording and reproducing apparatus.

The optical disk transportation apparatus according to the second exemplary aspect of this invention can achieve the optical disk transportation apparatus using the transportation body according to the first exemplary aspect of the present invention by a simple and easy method, because the optical disk transportation apparatus includes the optical disk placement unit and the optical disk transportation unit mentioned above.

(9) In a preferred example of the optical disk transportation apparatus according to the second exemplary aspect of this invention, the information recording and reproducing apparatus includes a loading tray that is movable between a storage state and a discharge state, the transportation body is placed on the loading tray in the discharge state, and the optical disk placement unit to place the flexible optical disk taken out from the optical disk storage device on the transportation body located on the loading tray.

(10) In further another preferred example of the optical disk transportation apparatus according to the second exemplary aspect of this invention, the information recording and reproducing apparatus includes a loading tray that is movable between a storage state and a discharge state, and the optical disk transportation unit moves the loading tray into the storage state after the flexible optical disk is placed on the transportation body located on the loading tray in the discharge state.

(11) In further another preferred example of the optical disk transportation apparatus according to the second exemplary aspect of this invention, the optical disk placement unit includes an adsorption pad attached to a transportation arm, and places the flexible optical disk on the transportation body after taking out the flexible optical disk from the optical disk storage device with the adsorption pad.

(12) In further another preferred example of the optical disk transportation apparatus according to the second exemplary aspect of this invention, the optical disk placement unit includes an adsorption pad attached to a transportation arm, and is configured to place the flexible optical disk on the transportation body after taking out the flexible optical disk from the optical disk storage device with the adsorption pad, and a plurality of the optical disks storage devices are arranged on a rotary table, and the adsorption pad is configured to be accessible to the optical disk stored in any one of the plurality of the optical disk storage devices, by a rotation of the rotary table.

(13) In further another preferred example of the optical disk transportation apparatus according to the second exemplary aspect of this invention, the information recording and reproducing apparatus includes an optical head that irradiates the optical disk placed on the transportation body with a laser beam from a bottom side of the transportation body through the rotation stabilizing board of the transportation body.

(14) In further another preferred example of the optical disk transportation apparatus according to the second exemplary aspect of this invention, the information recording and reproducing apparatus includes an optical head that irradiates the optical disk placed on the transportation body with a laser beam from a bottom side of the transportation body without involving the rotation stabilizing board of the transportation body.

(15) An optical disk transportation method according to the third exemplary aspect of this invention which transports the flexible optical disk between an optical disk storage device and an information recording and reproducing apparatus is characterized by including:

a first step of placing the flexible optical disk on the transportation body according to the first exemplary aspect of the present invention after taking out the flexible optical disk stored in the optical disk storage device; and a second step of transporting the transportation body on which the optical disk is placed, to the information recording and reproducing apparatus.

The optical disk transportation method according to the third exemplary aspect of this invention can achieve the optical disk transportation apparatus using the transportation body according to the first exemplary aspect of this invention by a simple and easy method, because the optical disk transportation method includes the first step (the optical disk putting step) and the second step (the optical disk transportation step) mentioned above.

(16) In a preferred example of the optical disk transportation method according to the third exemplary aspect of this invention, the information recording and reproducing apparatus includes a loading tray that is movable between a storage state and a discharge state, and the transportation body is placed on the loading tray in the discharge state, and in the first step, the flexible optical disk taken out from the optical disk storage device is placed on transportation body located on the loading tray.

(17) In further another preferred example of the optical disk transportation method according to the third exemplary aspect of this invention, the information recording and reproducing apparatus includes a loading tray that is movable between a storage state and a discharge state, and in the first step, the flexible optical disk is placed on the transportation body located on the loading tray in the discharge state, and in the second step, the loading tray is moved into the storage state.

(18) In further another preferred example of the optical disk transportation method according to the third exemplary aspect of this invention, in the first step, the flexible optical disk is taken out from the optical disk storage device and placed on the transportation body with an adsorption pad attached to a transportation arm.

(19) In further another preferred example of the optical disk transportation method according to the third exemplary aspect of this invention, a plurality of the optical disk storage devices are arranged on a rotary table, and the optical disk stored in any one of the plurality of the optical disk storage devices is accessible by rotating the rotary table with the adsorption pad attached to the transportation arm.

(20) In further another preferred example of the optical disk transportation method according to the third exemplary aspect of this invention, the information recording and reproducing apparatus includes an optical head that irradiates the optical disk placed on the transportation body with a laser beam from a bottom side of the transportation body through the rotation stabilizing board of the transportation body.

(21) In further another preferred example of the optical disk transportation method according to the third exemplary aspect of this invention, the information recording and reproducing apparatus includes an optical head that irradiates the optical disk placed on the transportation body with a laser beam from a bottom side of the transportation body without involving the rotation stabilizing board of the transportation body.

Advantageous Effects

The transportation body for the flexible optical disk according to the first exemplary aspect of this invention has the following advantageous effects. (a) deformation of the flexible optical disk at the time of rotation and transportation can be suppressed without complicating the structure of various apparatuses (an optical disk information recording and reproducing apparatus, an optical disk changer, an optical disk accessor, or the like) using the flexible optical disk; and (b) recording/reproduction of information with respect to the flexible optical disk can be done stably with the general-purpose optical drive.

The optical disk transportation apparatus according to the second exemplary aspect of this invention and the optical disk transportation method according to the third exemplary aspect of this invention has an advantageous effect that the optical disk transportation apparatus using the transportation body according to the first exemplary aspect of this invention can be achieved by a simple and easy method.

BRIEF DESCRIPTION OF DRAWINGS

FIG. 10B is continued from FIG. 10A;

FIG. 10C is continued from FIG. 10B;

FIG. 11A is continued from FIG. 10C;

FIG. 11B is continued from FIG. 11A;

FIG. 11C is continued from FIG. 11B;

EXPLANATION OF REFERENCE

1 TRANSPORTATION BODY
2 ROTATION STABILIZING BOARD
3 SPACER
4 OPTICAL DISK ALIGNMENT UNIT
5 ROTATION AXIS
6 THROUGH HOLE
7 TAPER BARREL PART
8 AIRFLOW
9 HEIGHT ADJUSTMENT PART
10 OPTICAL DISK
11 SPINDLE MOTOR
12 CLAMPER
13 ALIGNMENT PART OF SPINDLE MOTOR
14 CONVEX PART OF CLAMPER
15 CONCAVE PART OF SPINDLE MOTOR
16 MAGNET BUILT-IN CLAMPER
17 IRON CORE BUILT-IN SPINDLE MOTOR
18 CLAMP AREA
19 RIM AREA
20 INFORMATION RECORD REPRODUCTION AREA
21 OPTICAL DRIVE
22 LOADING TRAY
22a CIRCULAR CONCAVE PART
22b THROUGH BORE PART
23a, 23b STORAGE DEVICE
24 NOTCH PART
25 ROTARY TABLE
26 ROTATION AXIS
27 LINEAR MOTION GUIDE
28 FLOW LINE
29 BALL SCREW
30 SLIDER
31 TRANSPORTATION ARM
32 ROTATION AXIS
33 CIRCULAR CONCAVE PART
34 ADSORPTION PAD
35 SYSTEM CONTROLLER
36 OPTICAL HEAD
37 SLED UNIT
38 BASE PLATE
39 LOADING TRAY GUIDE
40 AXIS
41 LOADING MOTOR
42 GEAR UNIT
43 OPTICAL DRIVE
50 RECESS OF CLAMPER
51 CLAMP PART OF CLAMPER
52 BRIM PART OF SPINDLE MOTOR
$\phi d$ DIAMETER OF CENTRAL HOLE OF OPTICAL DISK
$\phi co$ OUTER DIAMETER OF OPTICAL DISK ALIGNMENT UNIT
$\phi ci$ INNER DIAMETER OF OPTICAL DISK ALIGNMENT UNIT
$\phi mo$ OUTER DIAMETER OF ALIGNMENT PART OF SPINDLE MOTOR
$\phi so$ OUTER DIAMETER OF ROTATION STABILIZING BOARD
ha TOTAL THICKNESS OF ROTATION STABILIZING BOARD, SPACER, OPTICAL DISK, AND HEIGHT ADJUSTMENT PART

BEST MODE FOR CARRYING OUT THE INVENTION

In the following, preferred exemplary embodiments of this invention are explained with reference to the attached drawings.

(Transportation Body for Optical Disk of First Exemplary Embodiment)

Figure 1A:
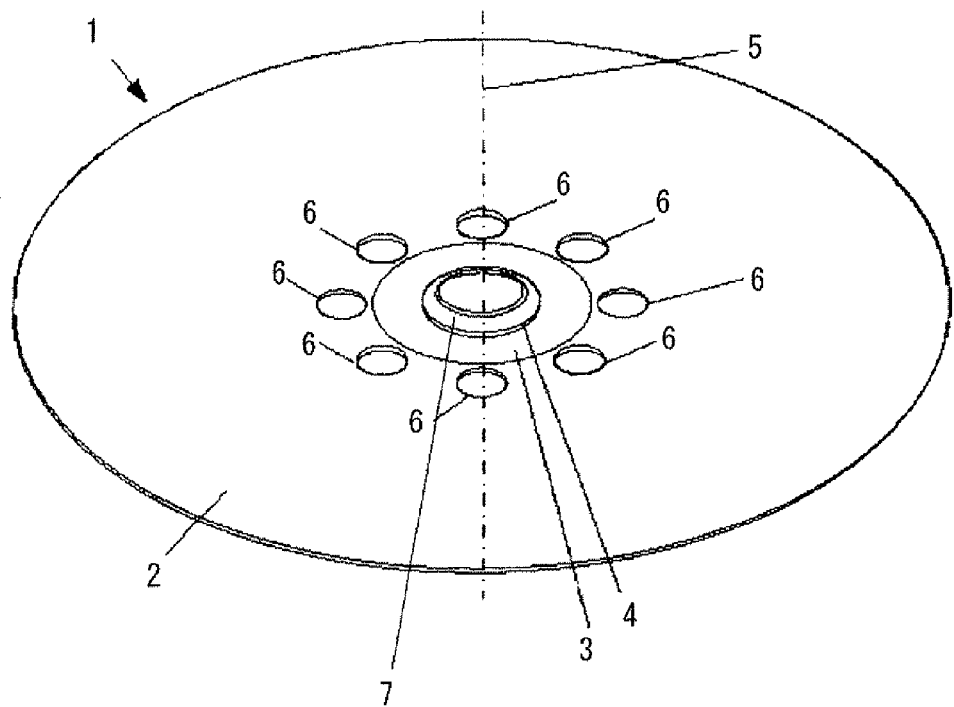
FIG. 1A is a perspective view showing an optical disk transportation body according to a first exemplary embodiment of the present invention viewed from obliquely above.
Figure 1B:
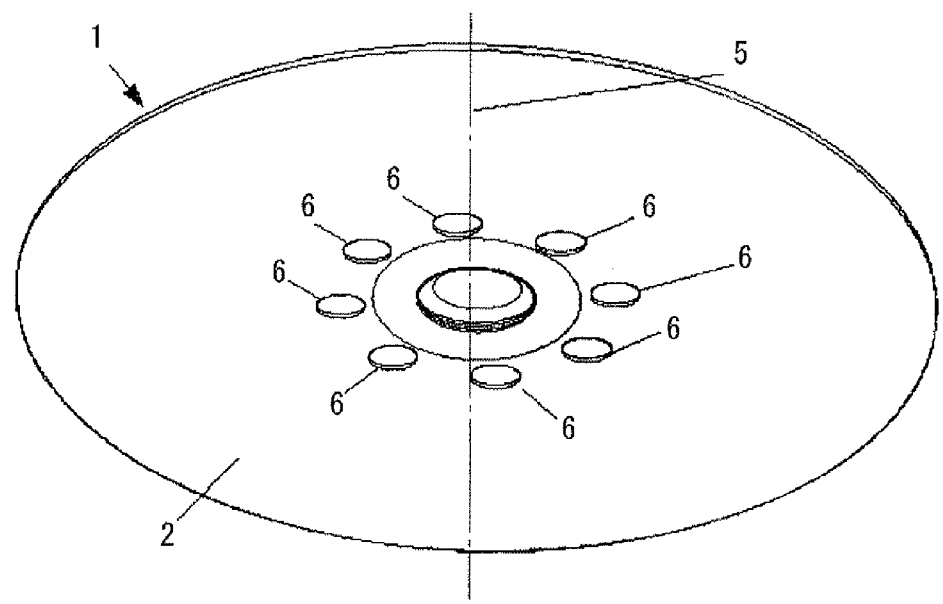
FIG. 1B is a perspective view showing the optical disk transportation body according to the first exemplary embodiment of the present invention viewed from obliquely below.
Figure 2:
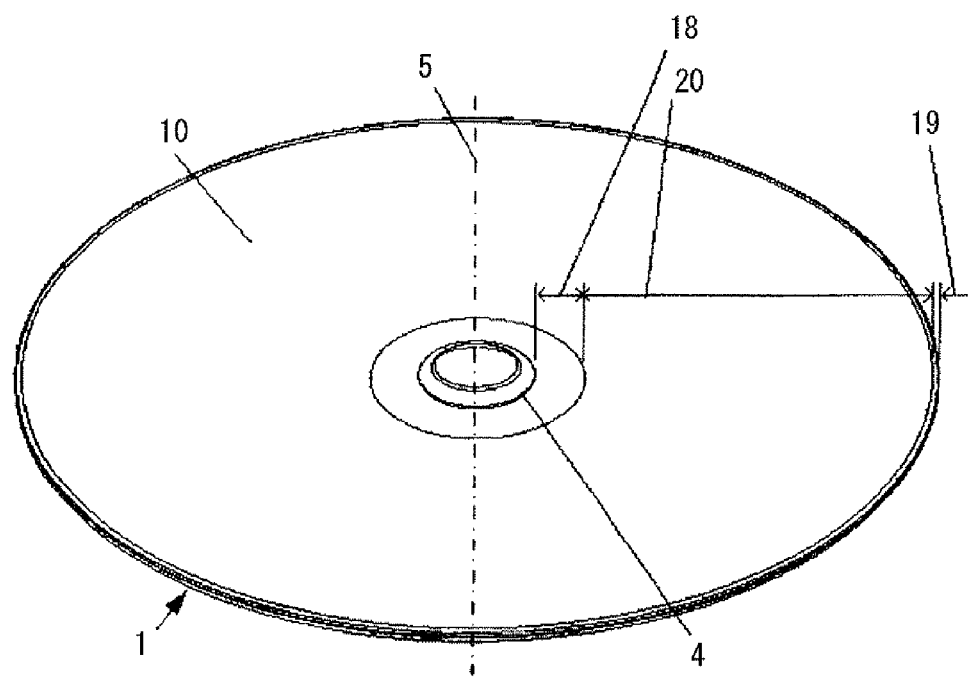
FIG. 2 is a perspective view showing a state of the optical disk transportation body on which an optical disk is placed according to the first exemplary embodiment of the present invention.
Figure 3:
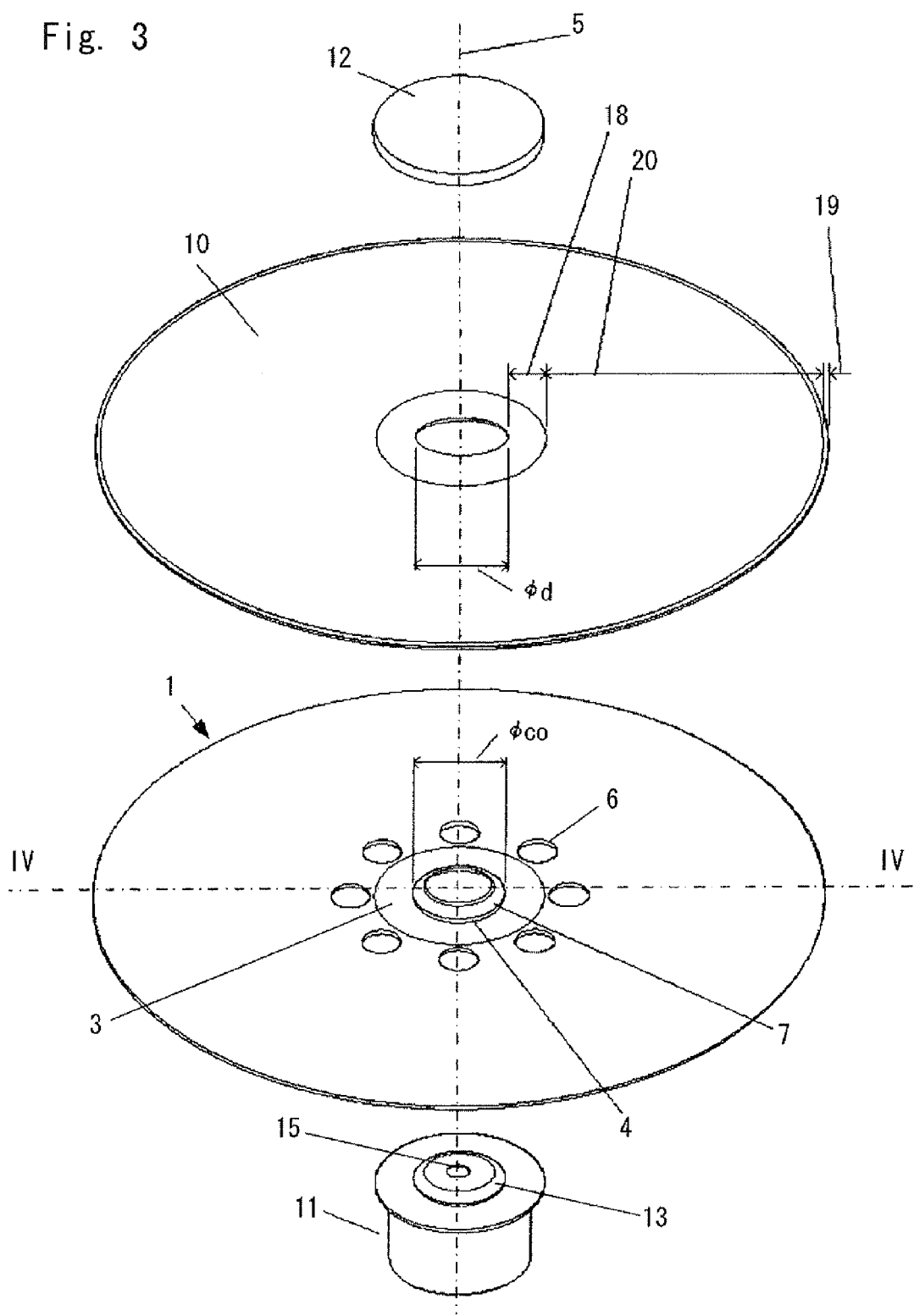
FIG. 3 is an exploded perspective view showing a rotary unit that makes the optical disk rotate about a rotation axis thereof using the optical disk transportation body according to the first exemplary embodiment of the present invention.
Figure 4:
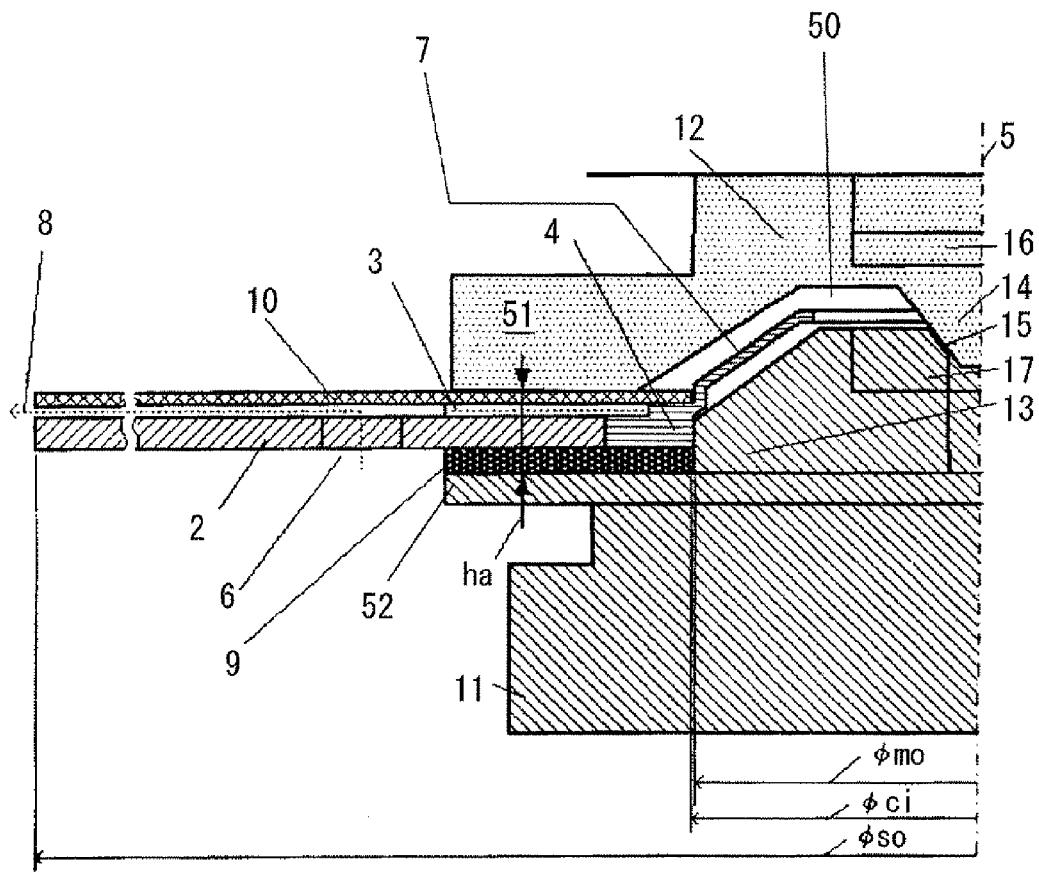
FIG. 4 is a schematic cross-sectional view showing a state where the optical disk transportation body and the optical disk are clamped to a spindle motor with a clamper according to the first exemplary embodiment of the present invention.

FIG. 1A and FIG. 1B show a transportation body 1 of an optical disk having the flexibility according to a first exemplary embodiment of the invention. FIG. 1A is a perspective view showing the transportation body 1 viewed from obliquely above. FIG. 1B is a perspective view showing the transportation body 1 viewed from obliquely below. Further, FIG. 2 is a perspective view showing a state of the transportation body 1 on which the flexible optical disk is placed. FIG. 3 is an exploded perspective view showing a rotary unit that makes the flexible optical disk rotate about a rotation axis thereof using the transportation body 1. FIG. 4 is a schematic cross-sectional view showing a state where the flexible optical disk and the transportation body 1 are clamped to a spindle motor with a clamper.

A flexible optical disk 10 transported by the optical disk transportation body 1 of the first exemplary embodiment, as shown in FIG. 3, has a disc shape (a hollow disk shape) having a through-hole (a central hole) at a center portion thereof. When shown the optical disk 10 has a thickness of about 0.1 mm-0.3 mm and is made of resin such as polycarbonate as a main component, the optical disk 10 has flexibility. The optical disk 10 is divided into a clamp area 18, an information recorded reproduction area 20, and a rim area 19 in a direction of its radius. A diameter of the central hole of the optical disk 10 is represented by φd.

The transportation body 1 of the first exemplary embodiment includes a rotation stabilizing board 2 having a through-hole (a central hole) formed in the center portion and has a disk shape (a hollow disk shape), a spacer 3 that is fixed concentrically to the central hole on a surface (an upper surface in FIGS. 1A and 1B) of the rotation stabilizing board 2 and has a through-hole (a central hole) in a center portion, and an optical disk alignment unit 4 attached to the inside of the central hole of the rotation stabilizing board 2. The rotation stabilizing board 2, the spacer 3, and the optical disk alignment unit 4 are integrated such that the centers thereof substantially coincide with a common rotation axis 5.

A plurality of through bores 6 is formed around the central hole of the rotation stabilizing board 2. These through bores 6 are arranged at regular intervals along one concentric circle (in other words, a circumference edge of the spacer 3) with the rotation axis 5 as a center. The diameter of the rotation stabilizing board 2 is approximately equal to the diameter of the optical disk 10.

The spacer 3 exists only in the vicinity of the central hole of the rotation stabilizing board 2. The spacer 3 supports the central part of the optical disk 10 by contacting with the central part of the optical disk 10 placed on the surface of the rotation stabilizing board 2 (see FIG. 4). Thus, a gap is formed between the bottom surface of the optical disk 10 (an under surface in FIGS. 1A and 1B) and the surface of the rotation stabilizing board 2. This gap is used to cause an airflow 8 to transmit at the time of rotation of the optical disk 10. An inner end part of the spacer 3 projects toward an inside of the central hole of the rotation stabilizing board 2 and is engages with a circumference part of the optical disk alignment unit 4.

The optical disk alignment unit 4 is a unit for self-adjustment such that the center position of the optical disk 10 placed on the surface of the rotation stabilizing board 2 coincides with the rotation axis 5, and the optical disk alignment unit 4 includes a taper barrel part 7 projecting convexly toward the side of the surface of the rotation stabilizing board 2. An outside diameter φco of the optical disk alignment unit 4 is slightly smaller than the diameter φd of the central hole of the optical disk 10. Therefore, the circumference part of the optical disk alignment unit 4 engages with the central hole of the optical disk 10, as shown FIG. 4.

As the material of the rotation stabilizing board 2, any material may be used when its shape change at the time of rotation integrally with the transportation body 1 can be neglected. Meanwhile, in the case where the information is recorded of reproduced by irradiating the optical disk 10 with a laser beam through the rotation stabilizing board 2, optical glass may be used.

As the material of the spacer 3 and the optical disk alignment unit 4, any material may be used as long as its shape change occurring at the time of rotation integrally with the transportation body 1 can be neglected. However, in terms of processibility and cost, a steel sheet may be preferably used.

A state shown in FIG. 2 occurs when the optical disk 10 is placed on the surface of the transportation body 1.

The optical disk 10 of the first exemplary embodiment uses a hollow disk made of polycarbonate resin having a thickness slightly smaller than 0.1 mm as a substrate. A spiral-shaped guide groove is transcribed in the information record reproduction area 20 by NIL (Nano Imprint Lithography) method. An aspect change record film (information record film) is formed on the guide groove. A protective film made of resin is further coated on the aspect change record film in the optical disk 10. Additionally, the total thickness of the optical disk 10 is approximately 0.1 mm. Further, the outer diameter of the optical disk 10 is set in a range of 120.0±0.3 mm, as with the outer diameter of the conventional optical disk such as a DVD or a CD.

The rotation stabilizing board 2 of the transportation body 1 may have at least a rigidity equivalent to that of the conventional optical disk such as a DVD of a CD in the direction of the rotation axis 5, so as to handle the transportation body 1, on which the optical disk 10 is placed, like the conventional optical disk such as a DVD of a CD, when the optical disk 10 is transported or rotated in the state where the optical disk 10 is placed on the transportation body 1. Specifically, in general, the rigidity of a certain object in the rotation axis direction is proportional to a product of its Young's modulus and a cube of a thickness in the rotation axis direction. Accordingly, a product of a Young's modulus of the rotation stabilizing board 2 and a cube of a thickness thereof is set to become equal to or greater than a product of a Young's modulus (=about 1.8 GPa approximately) of the polycarbonate, which is the main component of the optical disk such as a DVD or a CD, and a cube of a thickness (=1.2 mm approximately) of the optical disk such as a DVD or a CD. Therefore, the rigidity of the transportation body 1 on which the optical disk 10 is placed can be made equivalent to the conventional optical disk such as a DVD or a CD.

The material of the rotation stabilizing board 2 incorporated in the transportation body 1 of the first exemplary embodiment is a soda-lime glass that is a general optical glass. The rigidity of the transportation body 1 on which the optical disk 10 is placed can be made equivalent to the conventional optical disk such as a DVD or a CD, when the thickness of the rotation stabilizing board 2 is set to (71 GPa/3 N*m) (1/3)=0.29 mm or more, because the Young' module of the soda-lime glass is proximately 71 GPa. The thickness of the rotation stabilizing board 2 of the first exemplary embodiment is set to 0.5 mm in view of easiness of material acquisition.

As shown in FIG. 3 and FIG. 4, the optical disk 10 is clamped (engaged) to the top end of a spindle motor 11 in a state where the optical disk 10 is supported by the optical disk alignment unit 4 of the transportation body 1 and the spacer 3, after the central hole of the rotation stabilizing board 2 is engaged with the top end part of the spindle motor 11, by pressing a clamper 12 from the upper side and sandwiching the optical disk 10 and the transportation body 1 from the upper side and lower side.

The rotation axis of the optical disk 10 becomes approximately equal to the rotation axis 5 of the transportation body 1 when the optical disk 10 is placed on the optical disk alignment unit 4, because the outer diameter $\phi co$ of the optical disk alignment unit 4 is set to become slightly smaller than the diameter $\phi d$ of the central hole of the optical disk 10.

Because the diameter $\phi d$ of the central hole of the optical disk 10 of the first exemplary embodiment is set in a range of 15.00 mm-15.15 mm, as with the diameter of the central hole of the conventional optical disk such as a DVD or a CD, the outer diameter $\phi co$ of the optical disk alignment unit 4 is set in a range of 14.99 mm-14.96 mm.

FIG. 4 is a schematic cross-sectional view showing a left side of a section of the axis 5 taken along a line IV-IV of FIG. 3 in a state where the optical disk 10 and the transportation body 1 are clamped to the spindle motor 11 by using the clamper 12.

As shown in FIG. 4, in a top end part of the spindle motor 11, an alignment part 13 is provided. The alignment part 13 has a shape (taper barrel shape) that fits an inner side of the taper barrel part 7 of the optical disk alignment unit 4 of the transportation body 1. In a central part of the alignment part 13, a concave part 15 engaged with a convex part 14 formed in the center of the clamper 12 is formed, and iron cores 17 are buried around the concave part 15.

The clamper 12 presses its lower surface against the surface of the optical disk 10 to hold it. In the lower surface of the clamper 12, the convex part 14 that fits the concave part 15 is formed in the central part, a clamp part 51 pressed against the optical disk 10 is formed at the circumference part, and in the space between the convex part 14 and the clamp part 51, a hollow 50 engaged with the taper barrel part 7 of the optical disk alignment unit 4 is formed. In an area between the convex part 14 of the clamper 12 and the upper surface, a magnet 16 is buried. The upper surface of the clamper 12 is approximately flat.

In the state of FIG. 4, the alignment part 13 formed in the top end part of the spindle motor 11 fits the inner side of the taper barrel part 7 of the optical disk alignment unit 4. Therefore, the transportation body 1 and the optical disk 10 engage with the spindle motor 11 in approximately a flat state. At this time, the convex part 14 formed in the center portion of the clamper 12 fits the concave part 15 formed in the center portion of the alignment part 13 of the spindle motor 11 and is positioned (centered). The clamp part 51 formed at the circumference part of the clamper 12 is brought into contact with the surface of the optical disk 10 to press it downward. The hollow 50 of the clamper 12 formed between the convex part 14 and the clamp part 51 engages with the taper barrel part 7 of the optical alignment unit 4.

Further, because the clamper 12 is pressed against the spindle motor 11 by an absorption power acting between the magnet 16 buried in the clamper 12 and the iron cores 17 buried in the spindle motor 11, the optical disk 10 and the transportation body 1 are clamped (engaged) to the top end part of the spindle motor 11.

The rotation axis 5 of the optical disk 10 (the transportation body 1) becomes approximately equal to the rotation axis of the spindle motor 11 when the transportation body 1 on which the optical disk 10 is placed is clamped to the spindle motor 11, because an inner diameter $\phi ci$ of the optical disk alignment unit 4 is set to be slightly larger than an outer diameter $\phi mo$ of the alignment part 13 of the spindle motor 11. Thus, the optical disk 10 rotates with the spindle motor 11 integrally with the transportation body 1 about substantially the same rotation axis 5 when the information is recorded or reproduced with respect to the optical disk 10. Therefore, the decentering of the optical disk 10 clamped to the spindle motor 11 is suppressed, with the result that, the recording/reproduction of the information with respect to the optical disk 10 can be done stably.

As the spindle motor 11 for use in the first exemplary embodiment, one for the conventional DVD apparatus or CD apparatus is used. Therefore, the inner diameter $\phi ci$ of the optical disk alignment unit 4 is set in the range of 15.00 mm-15.15 mm, as with the diameter of the central hole of the conventional optical disk such as a CD or a DVD.

In this embodiment, a height adjustment part 9 is added in the optical disk alignment unit 4. The height adjustment part 9 is formed of a hollow disk-shaped member, its central axis is approximately equal to the axis 5 of the transportation body 1, and the central axis is fixed to the bottom end of the optical disk alignment unit 4. The inner diameter of the hollow disk-shaped member that forms the height adjustment part 9 is set to be slightly larger than the inner diameter $\phi ci$ of the optical disk alignment unit 4. The outer diameter of this member is set to become approximately equal to the outer diameter of the spacer 3, and its height (thickness) is set so that a total thickness ha (a total of the thickness of the height adjustment part 9, the rotation stabilizing board 2, the spacer 3, and the optical disk 10) becomes approximately equal to 1.2 mm that is the thickness of the conventional optical disk such as a CD or a DVD. A part of the height adjustment part 9 which is positioned at an outside relative to the optical disk alignment unit 4 is fixed to the bottom surface of the rotation stabilizing board 2. The surface of the height adjustment part 9 on the opposite side of the rotation stabilizing board 2 is in contact with a brim part 52 of the spindle motor 11. Additionally, as the material of the height adjustment part 9, a steel sheet may be preferably used for the same reason as the spacer 3.

Even if the height adjustment part 9 is not used, the effect of the present invention is obtained. However, by making the total thickness ha approximately equal to the thickness of the conventional optical disk such a CD or a DVD, a clamping force on the optical disk 10 generated by the clamper 12 can be equal to a clamping force for clamping the conventional optical disk in a CD or a DVD. Therefore, the rotation mechanism for the optical disk 10 can be achieved with simplicity.

When the optical disk 10 is rotated integrally with the transportation body 1 by the spindle motor 11, as shown FIG. 4, an air flows into the gap between the surfaces of the optical disk 10 and the transportation body 1 (the rotation stabilizing board 2) through the plurality of the through bores 6 formed on the inner diameter side of the optical disk 10, and the airflow 8 that flows toward the circumference of the optical disk 10 from the through bores 6 is generated. By the Bernoulli effect caused by the airflow 8 generated in this way, the gap between the optical disk 10 and the transportation body 1 is maintained at a value approximately equal to the thickness of the spacer 3. Therefore, the surface wobbling of the optical disk is suppressed. Because an outer diameter ipso of the rotation stabilizing board 2 is set to 120.3 mm as the maximum outer diameter of the optical disk 10, the surface wobbling of the optical disk 10 is suppressed even at the circumference edge of the optical disk 10.

The spacer 3 may have any thickness as long as the Bernoulli effect is obtained. However, the thickness may be preferably set in a range of 0.1 mm-0.3 mm when a general rotational speed used for recording/reproducing the information with respect to the optical disk 10 is in a range of 1000 rpm-12000 rpm. In the first exemplary embodiment, the thickness of the spacer 3 is 0.1 mm.

Because the transportation body 1 of the flexible optical disk of the first exemplary embodiment has the construction as mentioned above, the airflow 8 is generated in the gap between the surfaces of the flexible optical disk 10 and the rotation stabilizing board 2, and the deformation (surface wobbling or tilt change) of the optical disk 10 at the time of rotation can be suppressed by using the Bernoulli effect.

Further, the flexible optical disk 10 is placed on the surface of the transportation body 1 (the rotation stabilizing board 2) so that its central hole engages with the optical disk alignment unit 4, and the optical disk alignment unit 4 and the spindle motor 11 are engaged with each other so that the rotation axes thereof coincide with each other. Therefore, the decentering of the axis of the rotation spindle motor 11 against the axis of the optical disk 10 can be repressed by the alignment action of the optical disk alignment unit 4.

Therefore, according to the transportation body 1 of the first exemplary embodiment, the decentering of the flexible optical disk 10 that is placed on the its surface and the deformation at the time of rotation can be suppressed, and thus, the recording/reproduction of the information with respect to the optical disk 10 can be done stably.

Further, a combination of the transportation body 1 and the optical disk 10 can be handled as an equivalent of the optical disk that has the conventional rigidity, because the flexible optical disk 10 is transported to the optical drive serving as the information recording and reproducing apparatus in the state where the flexible optical disk 10 is placed on the surface of the transportation body 1 (rotation stabilizing board 2).

Therefore, according to the transportation body 1 of the first exemplary embodiment, a complexity of the structure of various apparatuses for transportation of the flexible optical disk 10, such as an optical disk changer and an optical disk accessor, can be avoided.

Further, the suppression of the deformation and the decentering of the optical disk 10 and the imparting of rigidity to the optical disk 10 can be achieved by the transportation body 1 that is separated from the optical drive serving as the information recording and reproducing apparatus. Therefore, the information can be recorded/reproduced with respect to the flexible optical disk 10 even by the general optical drive.

Hence, according to the transportation body 1 of the first exemplary embodiment, the structure of the optical disk information recording and reproducing apparatus using the flexible optical disk 10 is not complicated.

For the above-mentioned reasons, according to the transportation body 1 of the first aspect of the present invention, the deformation of the flexible optical disk 10 at the time of rotation and transportation can be suppressed without complicating of the structure of various apparatuses (an optical disk information recording and reproducing apparatus, an optical disk changer, an optical disk accessor, or the like) using the flexible optical disk 10. Further, the recording/reproduction of the information with respect to the flexible optical disk 10 can be done stably by using the general-purpose optical drive.

(Optical Disk Transportation Apparatus of First Exemplary Embodiment)

Figure 5:
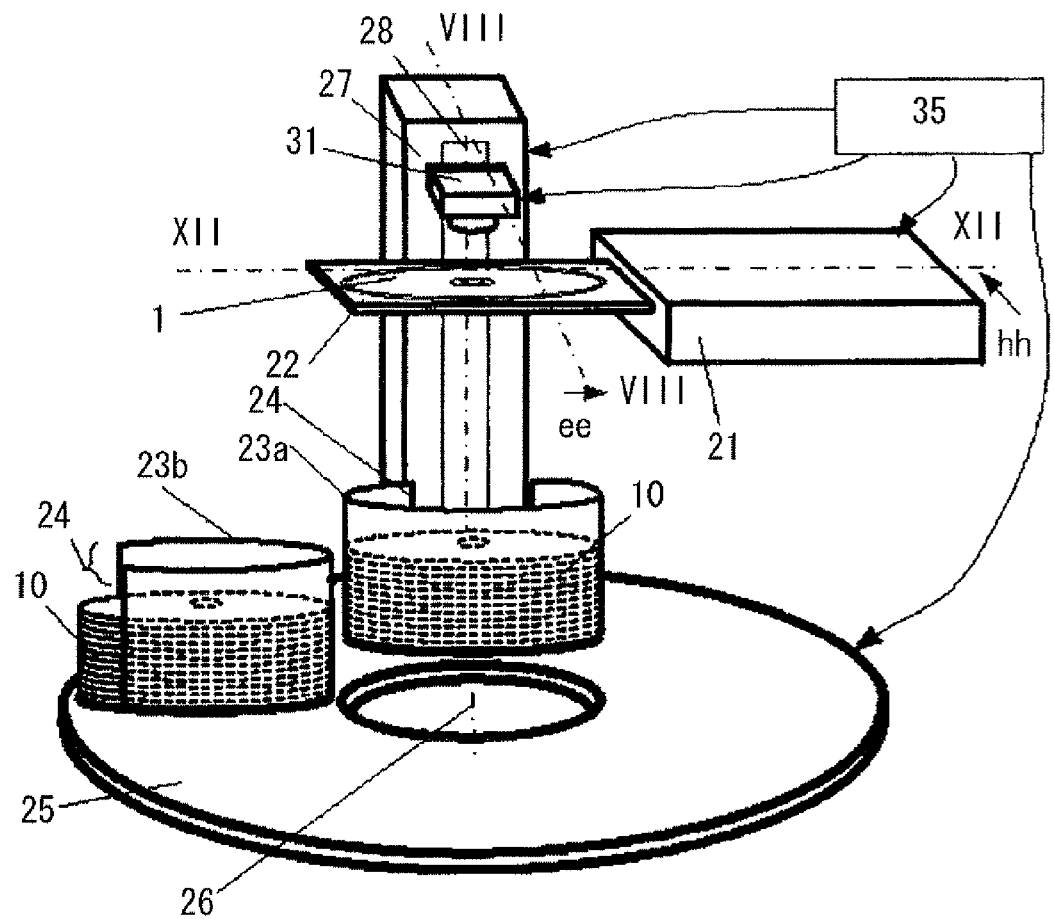
FIG. 5 is a perspective view showing an outline construction of an optical disk transportation apparatus according to the first exemplary embodiment of the present invention, in which a rotary table is positioned at an "angle of 0"

Next, an optical disk transportation apparatus of the first exemplary embodiment that uses the optical disk transportation body 1 having the structure as mentioned above is explained by referring to FIG. 5. FIG. 5 is a perspective view showing an outline construction of this optical disk transportation apparatus.

The optical disk transportation apparatus of the first exemplary embodiment includes an optical drive 21 that records/reproduces information with respect to the flexible optical disk 10, a disk-shaped rotary table 25 that is rotated in a horizontal plane as needed, first and second optical storage devices 23a, 23b that are placed on the rotary table 25, a linear motion guide 27 that is installed adjacent to the rotary table 25 and extends in a vertical direction, and a transportation arm 31 for the transportation of the optical disk 10, which is supported by the linear motion guide 27 and is movable upward and downward along a flow line 28 (this extends in the vertical direction) of the linear motion guide 27. The linear motion guide 27 transports the flexible optical disk 10 between the first optical disk storage device 23a and the second optical disk storage device 23b that are placed on the rotary table 25, and between the first optical disk storage device 23a or the second optical disk storage device 23b and the optical drive 21.

In the optical disk transportation apparatus of the first exemplary embodiment, a system controller 35 integratedly controls the motions of the optical drive 21, the rotary table 25, the linear motion guide 27, and the transportation arm 31. The system controller 35 can be easily achieved by a general-purpose CPU or the like.

In this embodiment, a front-loading type optical drive employed in the optical disk apparatus such as a general DVD apparatus is used as the optical drive 21. The above-mentioned transportation body 1 is placed in advance on a loading tray 22 of the optical drive 21. The optical drive 21 is fixed to a housing that is not shown.

Cylindrical containers are used as the first and second optical disk storage device 23a, 23b. The cylindrical containers each have a notch part 24 formed in a part of a side wall, and top surfaces thereof are opened. Each of the optical disk storage devices 23a, 23b can stack and store a number of disks 10 corresponding to the height of the optical disk storage devices.

The first and second optical disk storage devices 23a, 23b are fixed onto the rotary table 25 so that the notch part 24 faces outward in a radiation direction of a rotation axis 26 of the rotary table 25. Positions of the optical disk storage devices 23a, 23b on the rotary table 25 are shifted from each other by 90 degrees. The rotary table 25 can be positioned around the axis 26 (this coincides with the central axis of the rotary table 25) at a predetermined angle by a rotary type motor and a rotary positioning control circuit that are not shown. As the rotary type motor and the rotary positioning control circuit, for example, a DC motor with a rotary type encoder that detects a rotation angle of the rotary type motor and a servo circuit that feeds back an output angle of the rotary type encoder can be used.

Figure 6:
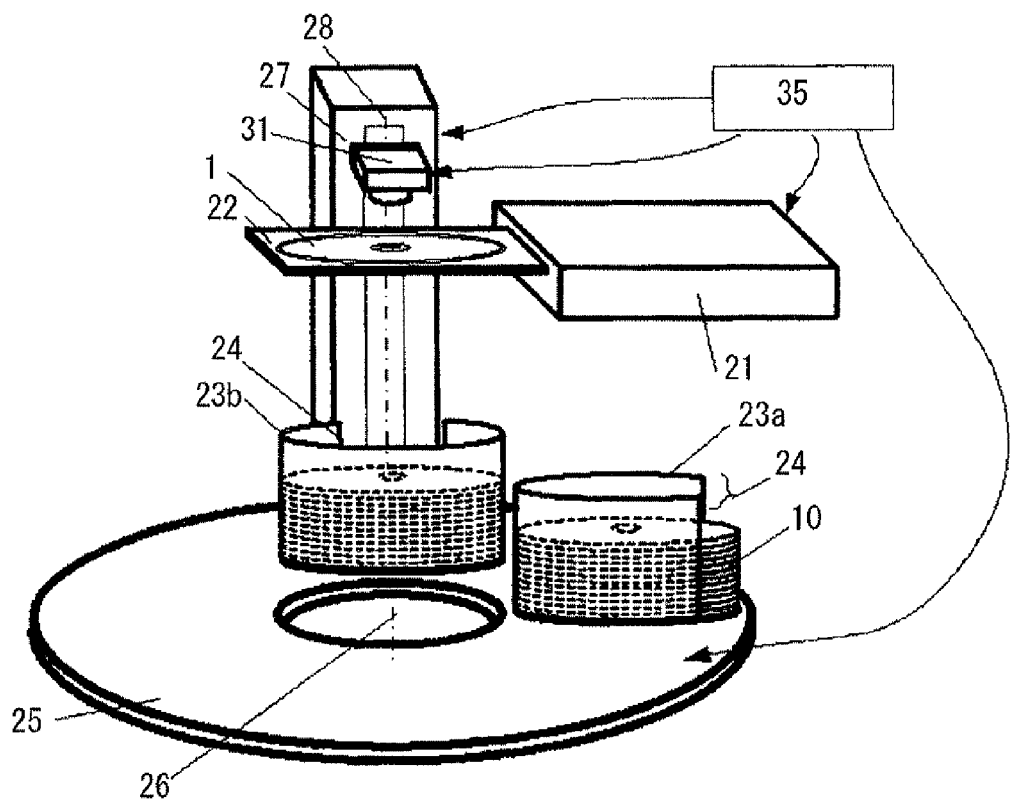
FIG. 6 is a perspective view showing an outline construction of the optical disk transportation apparatus according to the first exemplary embodiment of the present invention, in which a rotary table is positioned at an "angle of 90"

FIG. 5 shows a state at the time when the angle of the rotary table 25 is determined at a position where the center in a circumference direction of the notch part 24 of the first optical disk storage device 23a approximately coincides with the flow line 28 of the linear motion guide 27. In the first exemplary embodiment, this state is defined as a state where the rotary table 25 is positioned at an "angle of 0 degrees". FIG. 6 shows a state at the time when the angle of the rotary table 25 is determined at a position where the center in the circumference direction of the notch part 24 of the second optical disk storage device 23b approximately coincides with the flow line 28 of the linear motion guide 27. In the first exemplary embodiment, this state is defined as a state where the rotary table 25 is positioned at an "angle of 90 degrees".

In the state where the rotary table 25 is positioned at the "angle of 0 degrees", the rotation center of the flexible optical disk 10 stored in the first optical disk storage device 23a approximately coincides with the rotation axis 5 of the transportation body 1 in the state (refer to FIG. 5) where the loading tray 22 is ejected to the outside of the housing of the optical drive 21. In the state where the rotary table 25 is positioned at the "angle of 90 degrees", the rotation center of the flexible optical disk 10 stored in the second optical disk storage device 23b approximately coincides with the axis 5 of the transportation body 1 in the state that the loading tray 22 is ejected to the outside of the housing of the optical drive 21.

The transportation arm 31 can approach close in (access) the flexible optical disks 10 stacked inside the inside of the first optical disk storage device 23a or the second optical disk storage device 23b through the notch part 24 in the state where the rotary table 25 is positioned at the "angle 0 of degrees" or "angle of 90 degrees".

Figure 7:
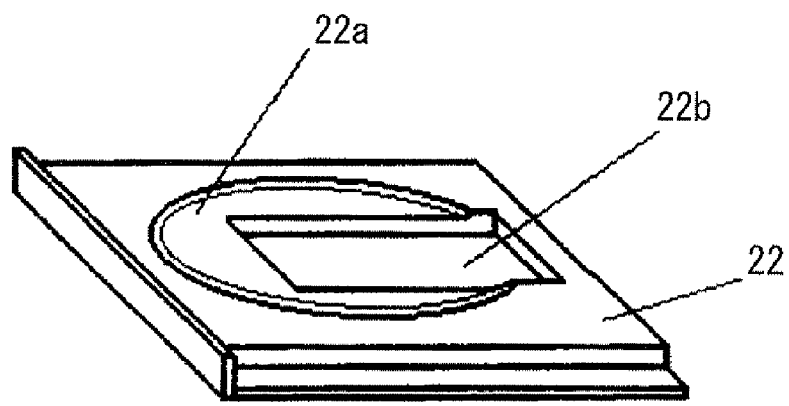
FIG. 7 is a perspective view showing an outline construction of a loading tray of an optical drive used for the optical disk transportation apparatus according to the first exemplary embodiment, and also showing the loading tray viewed in the same direction as FIG. 5.

FIG. 7 is a perspective view showing an outline construction of the loading tray 22 used in the first exemplary embodiment, when the loading tray 22 is viewed in the same direction as FIG. 5.

A circular concave part 22a having an inner diameter slightly greater than that of the transportation body 1 is formed in the loading tray 22, and a taper is formed at the circumference edge of the circular concave part 22a so as to facilitate engagement with the transportation body 1. The transportation body 1 can be positioned at a predetermined position on the loading tray 22 by circular concave part 22a. A through hole part 22b is formed in the loading tray 22 so as to over lap the circular concave part 22a, and the bottom surface of the transportation body 1 on the loading tray 22 is exposed downward through the through hole part 22b.

Figure 8:
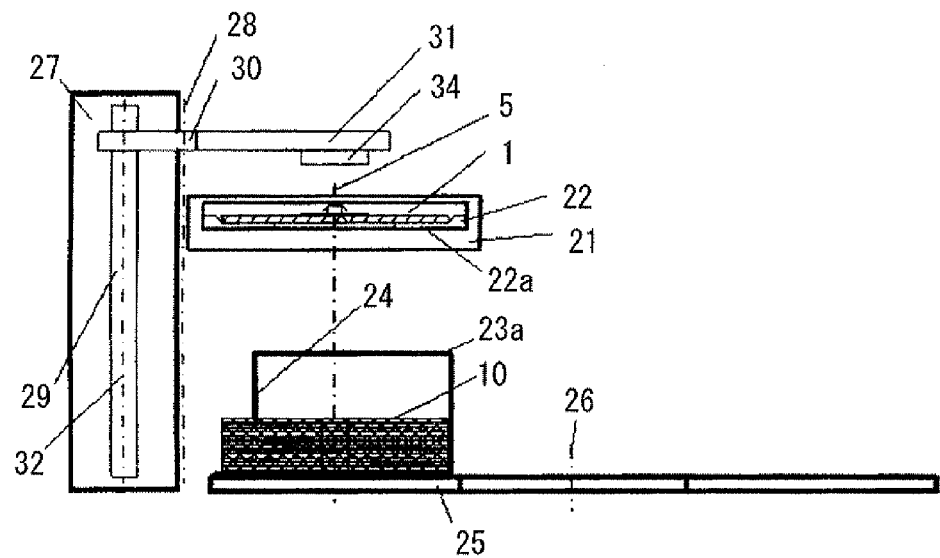
FIG. 8 is a schematic cross-sectional view showing a section of the optical disk transportation apparatus taken along a line VIII-VIII when viewed in a direction ee which is perpendicular to the section VIII-VIII according to the first exemplary embodiment of the present invention.

FIG. 8 is a schematic cross-sectional view showing a section of the optical disk transportation apparatus of the first exemplary embodiment shown in FIG. 5 taken along a line VIII-VIII when viewed in a direction ee that is perpendicular to the section VIII-VIII.

As shown FIG. 8, the linear motion guide (linear motion rolling guide) 27 includes a ball screw 29 that rotates about a rotation axis 32 extending in the vertical direction, a rotary type motor (not shown) that rotates the ball screw 29, a slider 30 that slides up and down along the flow line 28 of the linear motion guide 27 according to the angle of the ball screw 29, a linear type encoder (not shown) that outputs position information depending on the position of the slider 30 along the flow line 28, and a servo circuit (not shown) that controls the rotation angle of the ball screw 29 based on the position information output by the linear type encoder. The transportation arm 31 is mounted to a tip part of the slider 30. The transportation arm 31 can be positioned at a desired position along the flow line 28 by controlling the linear motion guide 27.

Figure 9:
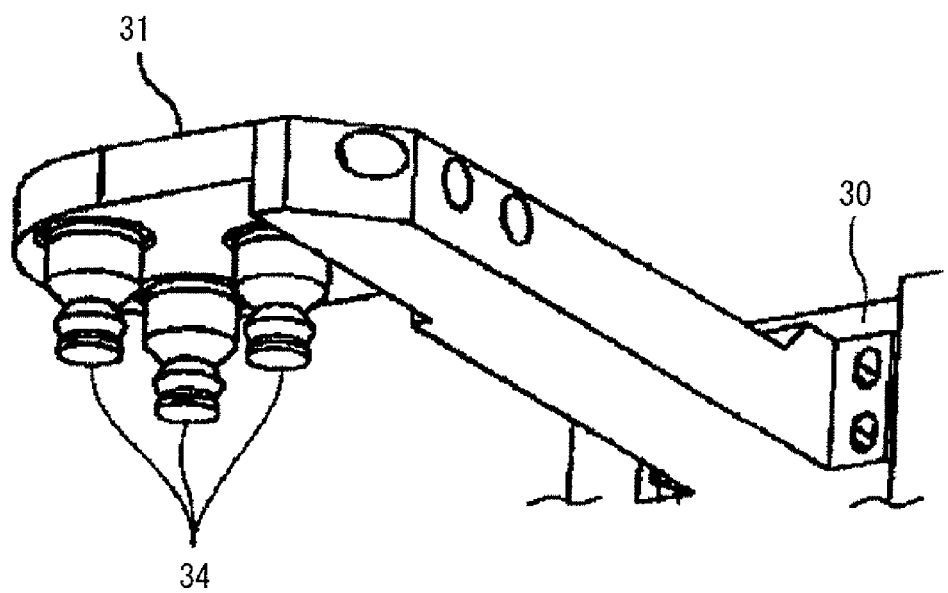
FIG. 9 is a perspective view showing a concrete construction example of a transportation arm used for the optical disk transportation apparatus according to the first exemplary embodiment of the present invention.

FIG. 9 is a perspective view showing a concrete construction example of the transportation arm 31.

As shown FIG. 9, a set of adsorption pads 34 that adsorbs a surface facing the transportation arm 31 of the optical disk 10 are mounted to the tip part of the transportation arm 31 away from the central hole of the optical disk 10. The number of the adsorption pads 34 is three in this embodiment.

Each the adsorption pads 34 is a sucker-like member made of rubber or the like and is connected to a vacuum pump (not shown) through a pressure-resistant tube or the like. Therefore, the optical disk 10 is held by the transportation arm 31 or released from the transportation arm 31 by switching between vacuum and pressure release through ON/OFF operation or the like of the vacuum pump.

Next, a motion of the optical disk transportation apparatus according to the first exemplary embodiment (this corresponds to an optical disk transportation method) such that the flexible optical disk 10 is transported from the first optical disk storage device 23a or the second optical disk storage device 23b to the optical drive 21 is explained with reference to FIGS. 10A-10C and FIGS. 11A-11C. In this embodiment, description is given of a case where the fifth optical disk 10 from the top of the stacked optical disks 10 in the first optical disk storage device 23a is transported to the optical drive 21, for example.

FIGS. 10A-10C and FIGS. 11A-11C are outline cross-sectional views showing sections of the optical disk transportation apparatus (refer to FIG. 5) of the first exemplary embodiment taken along the line VIII-VIII when viewed in the direction ee that is perpendicular to the line VIII-VIII, like FIG. 8.

Figure 10A:
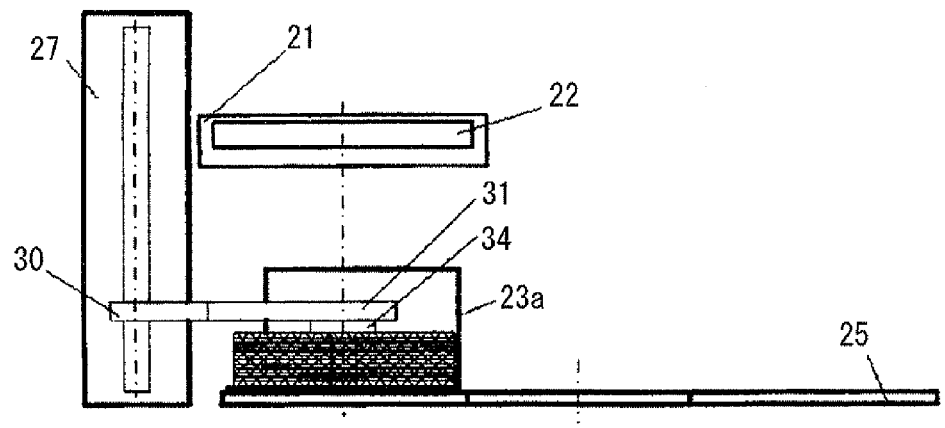
FIG. 10A is an outline cross-sectional view showing a motion of the optical disk transportation apparatus step by step according to the first exemplary embodiment of the present invention, and also showing a section of this apparatus taken along a line VIII-VIII when viewed in the direction ee which is perpendicular to the section VIII-VIII.

Upon transportation of the optical disk 10, as shown FIG. 10A, the system controller 35 first loads the loading tray 22 into the optical drive 21, and positions the rotary table 25 at the position of the "angle of 0 degrees" (refer to FIG. 5).

Next, the slider 30 is moved, to lower the transportation arm 31 to a position where the adsorption pad 34 comes into contact with the flexible optical disk 10 located at the top of the first optical disk storage device 23a, and the adsorption pad 34 adsorbs by vacuum the optical disk 10 located at the top of the first optical disk storage device 23a. At this time, the position where the adsorption pad 34 comes into contact with the optical disk 10 located at the top is detected by a pressure sensor (not shown) that detects a suction pressure of the adsorption pad 34 and is provided in an airflow path leading to the adsorption pad 34.

More specifically, in the case where the transportation arm 31 is lowered while air is sucked from the adsorption pad 34, the suction pressure of the adsorption pad detected by the pressure sensor rapidly increases from a value of approximately 0 when the adsorption pad 34 comes into contact with the optical disk 10 located at the top. Therefore, it is possible to detect the position where the adsorption pad 34 comes into contact with the optical disk 10 by detecting a timing when the pressure at this time exceeds a predetermined reference value. However, the detection of the position where the adsorption pad 34 comes into contact with the optical disk 10 may be carried out by other methods, for example, by using a proximity sensor using an LED (Light Emitting Diode) that is installed on a surface facing the optical disk 10 of the transportation arm 31.

Figure 10B:
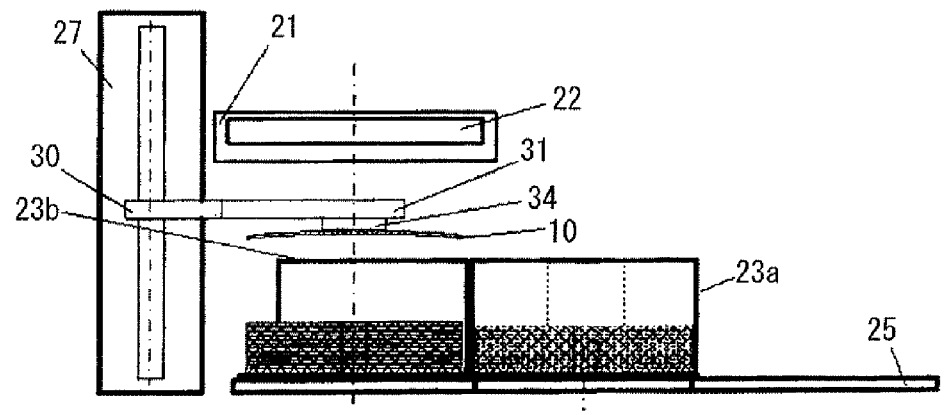
FIG. 10B is an outline cross-sectional view showing a motion of the optical disk transportation apparatus step by step according to the first exemplary embodiment of the present invention, and also showing a section of this apparatus taken along the line VIII-VIII when viewed in the direction ee which is perpendicular to the section VIII-VIII.

Next, by the control of the system controller 35, as shown FIG. 10B, the optical disk 10 that is adsorbed by vacuum by the adsorption pad 34 is lifted in the vertical direction by the transportation arm 31, and the rotary table 25 is rotated and positioned in the state of "angle of 90 degrees" (refer to FIG. 6) after the bottom surface of the adsorption pad 34 moves to the position that is higher than the top end of the first optical disk storage device 23a.

Subsequently, by the control of the system controller 35, as shown FIG. 10C, the transportation arm 31 is lowered until the bottom surface of the adsorption pad 34 reaches a height that is approximately equal to the top end of the second optical disk storage device 23b, and the adsorption pad 34 is opened to the atmospheric pressure at this position. As a result, the optical disk 10 is released from the adsorption pad 34 and falls, and the optical disk 10 is stored in the second optical disk storage device 23b. Then, the rotary table 25 is rotated again to restore the rotary plate 25 to the state of "angle of 0 degrees".

Figure 10C:
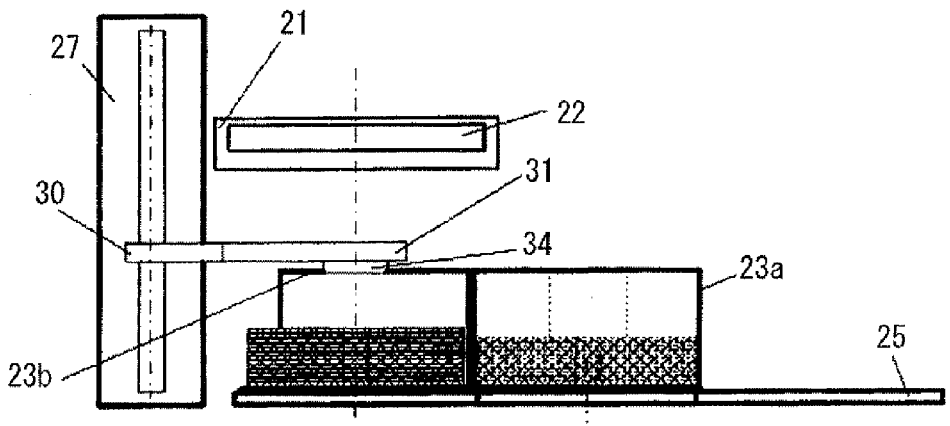
FIG. 10C is an outline cross-sectional view showing a motion of the optical disk transportation apparatus step by step according to the first exemplary embodiment of the present invention, and also showing a section of this apparatus taken along the line VIII-VIII when viewed in the direction ee which is perpendicular to the section VIII-VIII.

The optical disk 10 that is located at the top of the first optical disk storage device 23a in FIG. 10A moves to the top of the second optical disk storage device 23b by a series of motions shown in FIGS. 10A-10C. When the series of motions are repeated four times, the desired optical disk 10 (the fifth optical disk 10 counted from the top of the optical disks 10 stacked in the first optical disk storage device 23a) that is to be transported to the optical drive 21 appears at the top of the first optical disk storage device 23a.

Figure 11A:
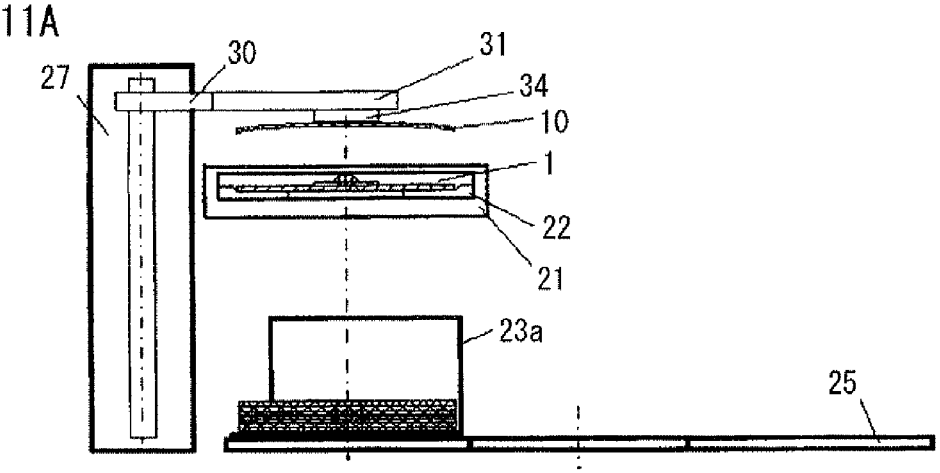
FIG. 11A is an outline cross-sectional view showing a motion of the optical disk transportation apparatus step by step according to the first exemplary embodiment of the present invention, and also showing a section of this apparatus taken along the line VIII-VIII when viewed in the direction ee which is perpendicular to this section.

Therefore, by the control of the system controller 35, as shown FIG. 11A, after the optical disk 10 that is to be transported to the optical disk drive 21 (this is located at the top of the first optical disk storage device 23a on the rotary table 25 in the state of "angle of 0 degrees") is adsorbed by vacuum by the adsorption pad 34, the optical disk 10 is lifted in the vertical direction by the transportation arm 31, and the optical disk 10 is transported to the predetermined position that is higher than the optical drive 21. Afterwards, the loading tray 22 of the optical drive 21 is moved and ejected to the outside of the housing. At this time, as shown FIG. 5, the loading tray 22 is positioned at the front of the flow line 28 of the slider 30.

Figure 11B:
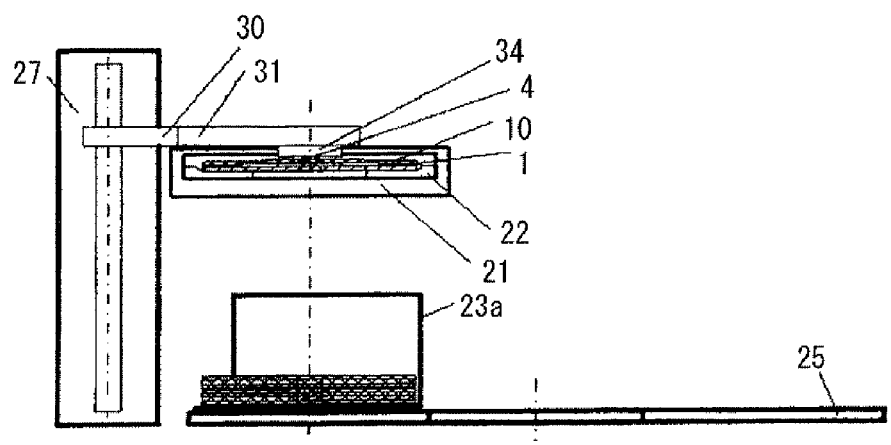
FIG. 11B is an outline cross-sectional view showing a motion of the optical disk transportation apparatus step by step according to the first exemplary embodiment of the present invention, and also showing a section of this apparatus taken along the line VIII-VIII when viewed in the direction ee which is perpendicular to this section.

Next, by the control of the system controller 35, as shown FIG. 11B, the transportation arm 31 is lowered until the bottom surface of the adsorption pad 34 reaches a position which is approximately equal to the top end of the optical disk alignment unit 4 of the transportation body 1 placed on the loading tray 22, and the adsorption pad 34 is opened to the atmospheric pressure at this position. As a result, the optical disk 10 is released from the adsorption pad 34 and placed on the optical disk alignment unit 4 of the transportation body 1.

In this optical disk transportation apparatus, the center of the rotation of the optical disk 10 stored in the first optical disk storage device 23a and the axis 5 of the transportation body 1 located on the discharged loading tray 22 approximately coincide with each other when the rotary table 25 is positioned in the state of the "angle of 0 degrees" (refer to FIG. 5). Therefore, the optical disk 10 released from the adsorption pad 34 is reliably placed on the optical disk alignment unit 4 of the transportation body 1.

Figure 11C:
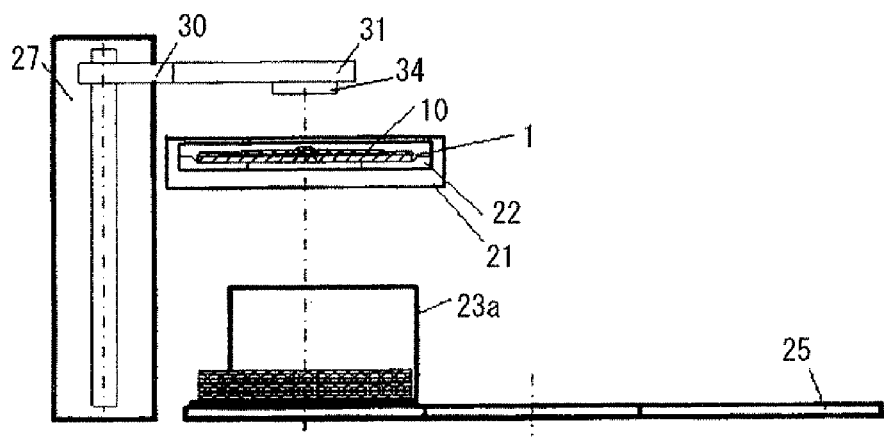
FIG. 11C is an outline cross-sectional view showing a motion of the optical disk transportation apparatus step by step according to the first exemplary embodiment of the present invention, and also showing a section of this apparatus taken along the line VIII-VIII when viewed in the direction ee which is perpendicular to this section.

Afterwards, by the control of the system controller 35, as shown FIG. 11C, the transportation arm 31 is moved to the predetermined position above the optical drive 21.

As described above, in the optical disk transportation apparatus of the first exemplary embodiment, through the above-mentioned series of motions shown in FIGS. 10A-10C and FIGS. 11A-11C, the desired optical disk 10 stored in the first optical disk storage device 23a is taken out and placed on the transportation body 1 located on the loading tray 22 of the optical drive 21. Then, the unit that transports and places the desired optical disk 10 stored in the first optical disk storage device 23a onto the transportation body 1 is achieved by using the adsorption pad 34 mounted to the transportation arm 31 driven (in other words, moved up and down) by the linear motion guide 27.

Figure 12A:
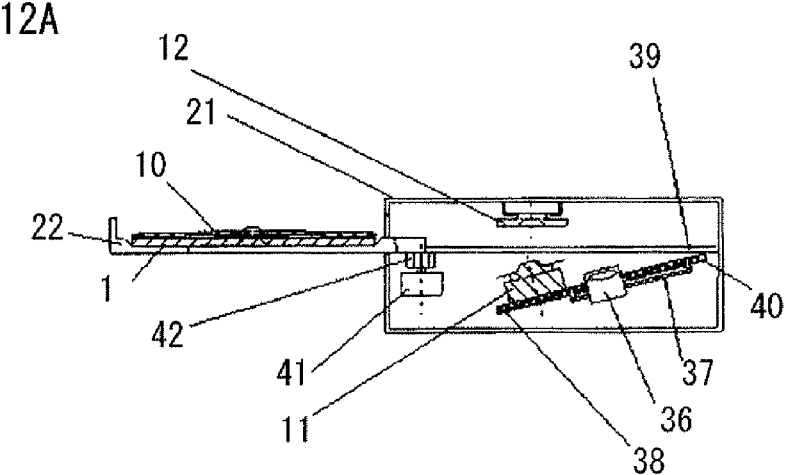
FIG. 12A is an outline cross-sectional view showing a motion of the optical disk transportation apparatus step by step according to the first exemplary embodiment of the present invention, also showing a section of this apparatus taken along a line VII-VII when viewed in a direction hh which is perpendicular to this section.
Figure 12B:
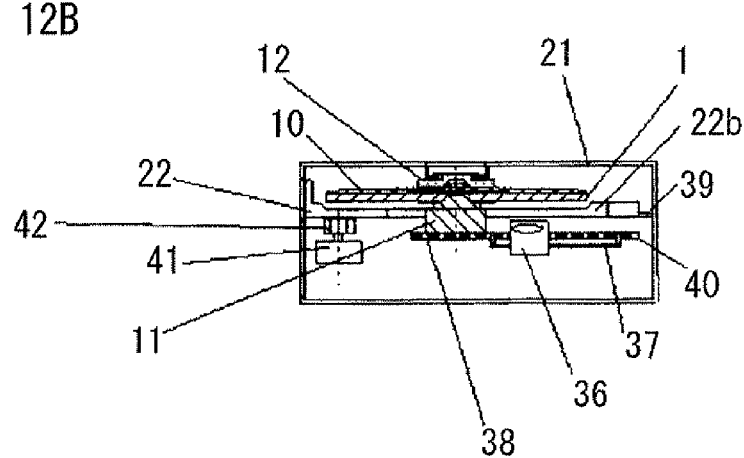
FIG. 12B is an outline cross-sectional view showing a motion of the optical disk transportation apparatus step by step according to the first exemplary embodiment of the present invention, and also showing a section of this apparatus take along the line VII-VII when viewed in the direction hh which is perpendicular to this section.

Next, in the optical disk transportation apparatus of the first exemplary embodiment, a motion to transport the optical disk 10 placed on the optical disk transportation body 1 to the inside of the optical drive 21 is explained by referring to FIGS. 12A and 12B. FIGS. 12A and 12B are outline cross-sectional views showing the sections of the optical disk transportation apparatus shown in FIG. 5 taken along a line XII-XII when viewed in a direction hh which is perpendicular to this section. The state of FIG. 12A corresponds to the state where the desired optical disk 10 is placed on the transportation body 1 which is placed on the loading tray 22 (this is in the ejected state) of the optical drive 21 (refer to FIG. 11C).

The optical drive 21 used in the optical disk transportation apparatus of the first exemplary embodiment has a construction generally used for the conventional DVD apparatus or the like.

More specifically, the optical disk drive 21 includes the spindle motor 11 that rotationally drives the optical disk 10, the clamper 12 that clamps the transportation body 1, on which the optical disk 10 is placed to the top end part of the spindle motor 11, an optical head 36 that records/reproduces information with respect to the optical disk 10 by using a laser beam, a sled unit 37 that displaces the optical head 36 in the radial direction of the optical disk 10, a base plate 38 to which the spindle motor 11 and the sled unit 37 are fixed, a loading tray guide 39 that guides the movement of the loading tray 22 in the horizontal direction, a loading motor 41 and a gear unit 42 that allow the loading tray 22 to move along the loading tray guide 39, and a linkage (does not describe) that moves the base plate 38 to the position of the FIG. 12A or the position of the FIG. 12B by rotating the base plate 38 about an axis 40 according to the position of the loading tray 22.

The clamper 12 is hang on the upper surface of the inside of the housing of the optical drive 21 so as to be rotatable about the rotation axis of the spindle motor 11 in the storage state of the loading tray 22. The axis 40 is provided at one end (a right end in FIG. 12A) of the base plate 38. The spindle motor 11 is fixed to the other end (a left end in FIG. 12A) of the base plate 38. The optical head 36 is attached so as to be movable on the base plate 38.

The linkage for rotating the base plate 38 is structured such that the spindle motor 11 reaches the position shown in FIG. 12A below the loading tray guide 39 (this extends in the horizontal direction) in the ejected state of the loading tray 22 shown in FIG. 12A. At this position, the base plate 38 is inclined at only a predetermined angle from the loading tray guide 39, with the result that the spindle motor 11 fixed onto the base plate 38 is away from the clamper 12. On the other hand, in the storage state of the loading tray 22 shown in FIG. 12B, the spindle motor 11 is structured such that the spindle motor 11 reaches to the position shown in FIG. 12B. At this position, the base plate 38 becomes parallel to the loading guide 39, with the result that the spindle motor 11 fixed onto the base plate 38 comes into contact with the clamper 12 in the state of FIG. 4.

First, in the state (refer to FIG. 12A and FIG. 11C) where the desired optical disk 10 is placed on the transportation body 1, which is placed on the loading tray 22 in the ejected state, by driving the loading motor 41 and the gear unit 42 based on the control of the system controller 35, the loading tray 22 is moved along the loading tray guide 39. Furthere, as shown FIG. 12B, the loading tray 22 is stored in the housing of the optical drive 21. In the storage state, the entirety of the loading tray 22 is loaded into the housing.

The base plate 38 is gradually rotated upward about the axis 40 along with the movement of the loading tray 22 to the storage state by the linkage. Therefore, the spindle motor 11 located on the base plate 38 gradually approaches the clamper 12. Then, as shown in FIG. 12B, the rotation at the predetermined angle of the base plate 38 is completed when the loading tray 22 reaches the storage state. In this case, the spindle motor 11 moves toward the clamper 12 through the through hole part 22b of the loading tray 22, and the top end part of the spindle motor 11 comes into contact with the clamper 12 in the storage state of the loading tray 22 (the state where the rotation of the base plate 38 is completed).

In the storage state of the loading tray 22, as understood from FIG. 12B, the top end part of the spindle motor 11 projects above the loading tray 22 through the through hole part 22b of the loading tray 22. Thus, therefore the transportation body 1 placed on the loading tray 22 is slightly pushed up from the loading tray 22 together with the optical disk 10 that is placed on the transportation body 1, and is pressed against the clamper 12 that is hang on the upper surface of the inside of the housing of the optical drive 21. As a result, the transportation body 1 and the optical disk 10 are clamped to the spindle motor 11 in the state shown FIG. 4. When the spindle motor 11 is rotated at a predetermined speed in this state, the transportation body 1 and the optical disk 10 are rotationally driven with the spindle motor 11. Therefore, the recording/reproduction of information with respect to the optical disk 10 is possible when a laser beam is emitted from the optical head 36, the laser beam is irradiated onto the bottom surface of the optical disk 10 through the through hole part 22b of the loading tray 22 and the rotation stabilizing board 2 of the transportation body 1, and reflected light from the optical disk 10 is received by the optical head 36. This recording/reproduction of the information can be stably done.

To transport the optical disk 10 located in the optical drive 21 to the first optical disk storage device 23a, the above-mentioned motions shown in FIGS. 12A-12B may be carried out in reverse order, and the motions shown in FIGS. 10A-10C and FIGS. 11A-11C may be further carried out in reverse order.

As mentioned above, in the optical disk transportation apparatus of the first exemplary embodiment, by the motions shown in FIGS. 12A-12B, the transportation body 1 on which the desired optical disk 10 is placed is transported from the receiving position to the recording/reproduction position in the optical drive 21 serving as the information recording and reproducing apparatus (more specifically, the position where information is recorded on, or information is reproduced from the optical disk 10 by rotating the optical disk 10). This transportation mechanism is achieved by using the loading motor 41 and the gear unit 42 that store or eject the loading tray 22 with respect to the housing of the optical drive 21.

Therefore, the use of the optical disk transportation apparatus (optical disk transportation method) of the first exemplary embodiment makes it possible to achieve the apparatus that transports the optical disk 10 to the information recording and reproducing apparatus that stably record/reproduces information with respect to the flexible optical disk 10 with the simple structure.

(Second Exemplary Embodiment)

Figure 13:
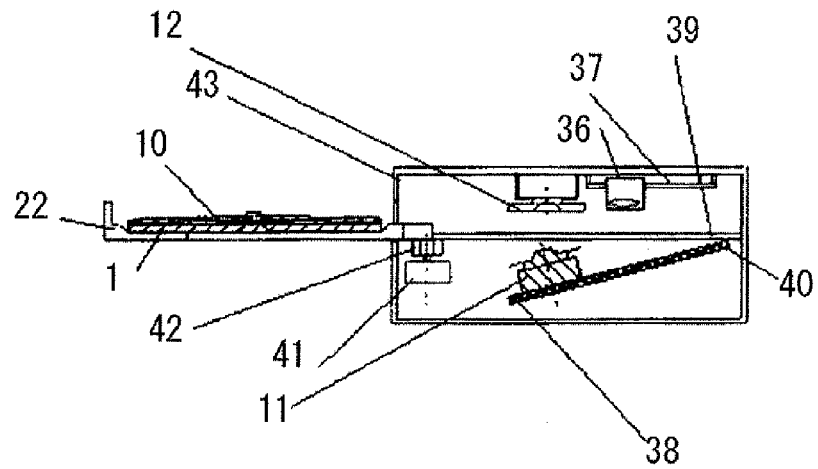
FIG. 13 is an outline cross-sectional view showing a motion of the optical disk transportation apparatus step by step according to a second exemplary embodiment of the present invention, and also showing a section of this apparatus taken along the line VII-VII when viewed in the direction hh which is perpendicular to this section.

FIG. 13 is an outline cross-sectional view showing a section of an optical disk transportation apparatus of a second exemplary embodiment of the present invention taken along the line XII-XII when viewed in the direction hh which is perpendicular to this section (refer to FIG. 5).

The present invention is not limited to the optical drive 21 shown in FIGS. 12A and 12B. For example, an optical drive 43 shown in FIG. 13 can be used.

The optical disk transportation apparatus of the second exemplary embodiment has the same construction as the optical disk transportation apparatus of the first exemplary embodiment, except for using the optical drive 43 shown in FIG. 13.

In the optical drive 43, the optical head 36 and the sled unit 37 are arranged inside the housing so as to face the spindle motor 11 fixed onto the base plate 38. The sled unit 37 is fixed onto the upper surface of the inside of the housing of the optical drive 21, and one end (a left end in FIG. 13) of the sled unit 37 is disposed adjacent to the clamper 12 hang on the upper surface of the inside of the same housing. The optical head 36 can be displaced in the radial direction of the optical disk 10 by the sled unit 37. On the base plate 38, only the spindle motor 11 is provided. The laser beam emitted from the optical head 36 is irradiated onto the optical disk 10 placed on the transportation body 1 on the loading tray 22, from the surface (uppersurface) side thereof, because the optical head 36 is located above the loading tray guide 39.

In the optical disk transportation apparatus of the second exemplary embodiment, the laser beam emitted from the optical head 36 is irradiated onto the optical disk 10 without passing through the rotation stabilizing board 2 of the transportation body 1, which eliminates the need to use optical glass as the material of the rotation stabilizing board 2. Therefore, it is possible to use a more inexpensive material such as a steel sheet for the production. When the steel sheet is used, the thickness of the rotation stabilizing board 2 may be thinner than that in the case of using the optical glass, because the Young's modulus of the steel sheet is around 201-216 GPa in general and is greater than that of the optical glass.

(Other Exemplary Embodiments)

The above-mentioned first and second exemplary embodiments are preferred examples of the present invention. Therefore, the present invention is not limited to these exemplary embodiments and can modified in various manners as a matter of course.

For example, in the above-mentioned first and second exemplary embodiments, the transportation body 1 is produced in which the rotation stabilizing board 2, the spacer 3, and the optical disk alignment unit 4 are separated parts. This is favorable in view of the processibility and cost. However, the effects of the present invention can be obtained even if these parts are not necessarily formed as separated parts. Specifically, by a cutting process of a glass sheet, a steel sheet, or the like, the transportation body 1 may be formed by integrally producing the rotation stabilizing board 2, the spacer 3, and the optical disk alignment unit 4.

This application is based upon and claims the benefit of priority from Japanese patent application No. 2008-070453, filed on Mar. 18, 2008, the disclosure of which is incorporated herein in its entirety by reference.

Industrial Applicability

The present invention can be applied to a transportation body that can transport a flexible optical disk while compensating for the low rigidity, and to an optical disk transportation apparatus and an optical disk transportation method that transport the flexible optical disk to various apparatuses using the flexible optical disk, such as an optical disk information recording and reproducing apparatus, an optical disk changer, and an optical disk accessor.

The invention claimed is:

1. A transportation body for a flexible optical disk, comprising:
   a rotation stabilizing board having a disc-shaped form;
   an optical disk alignment unit installed in a central part of the rotation stabilizing board; and
   a spacer installed on a surface of the rotation stabilizing board, a thickness of the spacer being from 0.1 to 0.3 mm,
   the rotation stabilizing board, the spacer, and the optical disk alignment unit being unified so that respective centers of the rotation stabilizing board, the spacer, and the optical disk alignment unit coincide with a rotation axis, and an inner end part of the spacer projects toward an inside of a central hole of the rotation stabilizing board and engages a circumference part of the optical disk alignment unit, wherein the rotation stabilizing board is positioned against an opposite surface of a recording surface of the flexible optical disk that is irradiated with a laser beam for recording or reproducing information, and supports the flexible optical disk from below, an entirety of the rotation stabilizing board being a steel sheet and having a light blocking effect.

2. The transportation body for the flexible optical disk according to claim 1, wherein the optical disk alignment unit includes a taper barrel part that can be engaged with a central hole of the optical disk, and an outer diameter of the taper barrel part is set smaller than a diameter of the central hole of the optical disk.

3. The transportation body for the flexible optical disk according to claim 1, wherein a product of a Young's modulus of the rotation stabilizing board and a cube of a thickness of the rotation stabilizing board in a direction along the rotation axis is set to become equal to $3N*m$ or greater than $3N*m$.

4. The transportation body for the flexible optical disk according to claim 1, wherein the optical disk alignment unit further includes a height adjustment part, and the rotation stabilizing board is installed on the height adjustment part.

5. The transportation body for the flexible optical disk according to claim 4, wherein a height or a thickness of the height adjustment part is set to such a value that a total thickness of the height adjustment part, the rotation stabilizing board, the spacer, and the optical disk becomes approximately equal to a thickness of an optical disk having a hardness higher than that of the flexible optical disk.

6. An optical disk transportation apparatus that transports a flexible optical disk between an optical disk storage device and an information recording and reproducing apparatus, comprising:

an optical disk placement unit to place the flexible optical disk on the transportation body according to claim 1 by taking out the flexible optical disk stored in the optical disk storage device; and an optical disk transportation unit to transport the transportation body on which the optical disk is placed to the information recording and reproducing apparatus, wherein the information recording and reproducing apparatus includes an optical head above the optical disk that irradiates the recording surface of the optical disk placed on the transportation body with the laser beam, the optical head positioned facing the recording surface of the optical disk to irradiate the recording surface of the optical disk.

7. The optical disk transportation apparatus according to claim 6, wherein the information recording and reproducing apparatus includes a loading tray that is movable between a storage state and a discharge state, the transportation body is placed on the loading tray in the discharge state, and the optical disk placement unit to place the flexible optical disk taken out from the optical disk storage device on the transportation body located on the loading tray.

8. The optical disk transportation apparatus according to claim 6, wherein the information recording and reproducing apparatus includes a loading tray that is movable between a storage state and a discharge state, and the optical disk transportation unit moves the loading tray into the storage state after the flexible optical disk is placed on the transportation body located on the loading tray in the discharge state.

9. The optical disk transportation apparatus according to claim 6, wherein the optical disk placement unit includes an adsorption pad attached to a transportation arm, and places the flexible optical disk on the transportation body after taking out the flexible optical disk from the optical disk storage device with the adsorption pad.

10. The optical disk transportation apparatus according to claim 6, wherein the optical disk placement unit includes an adsorption pad attached to a transportation arm, and is configured to place the flexible optical disk on the transportation body after taking out the flexible optical disk from the optical disk storage device with the adsorption pad, and a plurality of the optical disks storage devices are arranged on a rotary table, and the adsorption pad is configured to be accessible to the optical disk stored in any one of the plurality of the optical disk storage devices, by a rotation of the rotary table.

11. The optical disk transportation apparatus according to claim 6, wherein the information recording and reproducing apparatus includes a base plate to which is mounted a spindle motor for driving the optical disk, the spindle motor, in use, engaging with a first side of the optical disk, and wherein the optical head is arranged to face the spindle motor and, in use, an opposite second side of the optical disk that comprises the recording surface.

12. An optical disk transportation method for transporting a flexible optical disk between an optical disk storage device and an information recording and reproducing apparatus, comprising:

a first step of placing the flexible optical disk on the transportation body according to claim 1 after taking out the flexible optical disk stored in the optical disk storage device; and a second step of transporting the transportation body on which the optical disk is placed on to the information recording and reproducing apparatus, wherein the information recording and reproducing apparatus is provided with an optical head that irradiates the recording surface of the optical disk placed on the transportation body with the laser beam, the optical head provided at a position above the optical disk and facing the recording surface of the optical disk.

13. The optical disk transportation method according to claim 12, wherein the information recording and reproducing apparatus comprises a loading tray that is movable between a storage state and a discharge state, and the transportation body is placed on the loading tray in the discharge state, and, in the first step, the flexible optical disk taken out from the optical disk storage device is placed on the transportation body located on the loading tray.

14. The optical disk transportation method according to claim 12, wherein the information recording and reproducing apparatus includes a loading tray that is movable between a storage state and a discharge state, and in the first step, the flexible optical disk is placed on the transportation body located on the loading tray in the discharge state, and in the second step, the loading tray is moved into the storage state.

15. The optical disk transportation method according to claim 12, wherein in the first step, the flexible optical disk is taken out from the optical disk storage device and placed on the transportation body with an adsorption pad attached to a transportation arm.

16. The optical disk transportation method according to claim 12, wherein a plurality of the optical disk storage devices are arranged on a rotary table, the optical disk stored in any one of the plurality of the optical disk storage devices is accessible by rotating the rotary table with the adsorption pad attached to the transportation arm.

17. The optical disk transportation method according to claim 12,
- wherein the information recording and reproducing apparatus is provided with a base plate to which is mounted a spindle motor for driving the optical disk, the spindle motor, in use, engaging with a first side of the optical disk, and
- wherein the optical head is arranged to face the spindle motor and, in use, an opposite second side of the optical disk that comprises the recording surface.

18. The transportation body for the flexible optical disk according to claim 1, wherein the rotation stabilizing board, the spacer, and the optical disk alignment unit are integrally produced.

* * * * *